(12) United States Patent
Ko et al.

(10) Patent No.: US 6,574,189 B1
(45) Date of Patent: Jun. 3, 2003

(54) CARTRIDGE HAVING SENSOR HOLE TO BE OPENED/CLOSED AND APPARATUS AND METHOD FOR DRIVING THE SAME

(75) Inventors: Jung-wan Ko, Yongin (KR); Dong-ho Shin, Seoul (KR); In-sik Park, Suwon (KR); Young-sun Seo, Sungnam (KR); Han-kook Choi, Suwon (KR); Jong-phil Park, Suwon (KR); Hee-deuk Park, Sungnam (KR); Kyu-hyeong Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/656,238

(22) Filed: Sep. 6, 2000

Related U.S. Application Data

(62) Division of application No. 09/204,275, filed on Dec. 3, 1998.
(60) Provisional application No. 60/067,946, filed on Dec. 8, 1997.

(30) Foreign Application Priority Data

| Dec. 6, 1997 | (KR) | 97-66479 |
| Jan. 14, 1998 | (KR) | 98-849 |
| Jun. 10, 1998 | (KR) | 98-21401 |
| Jun. 25, 1998 | (KR) | 98-24157 |
| Jul. 30, 1998 | (KR) | 98-30964 |

(51) Int. Cl.$^7$ .............................................. G11B 23/03

(52) U.S. Cl. ..................................................... 369/291

(58) Field of Search ................................. 369/291, 289, 369/272, 127, 217, 256, 244, 176; 360/78.11, 99.06

(56) References Cited

U.S. PATENT DOCUMENTS

| 4,849,958 A | | 7/1989 | Douwes et al. ............. 369/77.2 |
| 5,541,903 A | | 7/1996 | Funahashi et al. ............ 369/54 |
| 5,715,233 A | | 2/1998 | Yoshida et al. ............. 369/289 |
| 5,903,531 A | | 5/1999 | Satoh et al. ............. 369/44.29 |
| 5,959,804 A | * | 9/1999 | Hashimoto ................ 360/99.06 |
| 5,982,740 A | | 11/1999 | Schwartz .................... 369/286 |
| 6,052,359 A | | 4/2000 | Fujiura ........................ 369/291 |
| 6,058,086 A | | 5/2000 | Yeo et al. ..................... 369/58 |
| 6,122,142 A | * | 9/2000 | Kabasawa ................ 360/99.06 |

FOREIGN PATENT DOCUMENTS

| EP | 0 421 775 | | 4/1991 |
| EP | 0 744 743 | | 11/1996 |
| EP | 0 768 665 | | 4/1997 |
| EP | 0 833 330 | | 4/1998 |
| JP | 04-281280 | | 6/1992 |
| JP | 09 282833 | | 10/1997 |
| JP | 08-265482 | * | 4/1998 |
| JP | 2000-11576 | | 1/2000 |
| JP | 2000-30406 | | 1/2000 |

OTHER PUBLICATIONS

JPO machine English translation of Kiyoshi et al (JP09–282833).*

* cited by examiner

Primary Examiner—George J. Letscher
(74) Attorney, Agent, or Firm—Staas & Halsey LLP

(57) ABSTRACT

A cartridge having a sensor hole to be opened/closed and a method and an apparatus for driving the same. To improve a problem that a cartridge receiving a DVD-RAM disc which has been once withdrawn therefrom performs the recording process under the same conditions as a bare disc, the disclosed cartridge has a unit for flexibly opening/closing the sensor hole in accordance with a result of a defect check, so that information processing process is greatly accelerated.

20 Claims, 21 Drawing Sheets

CARTRIDGE HAVING SENSOR HOLE TO BE OPENED/CLOSED AND APPARATUS AND METHOD FOR DRIVING THE SAME

This application is a divisional of application Ser. No. 09/204,275, filed Dec. 3, 1998, now pending, which claims the benefit of Korean Application Ser. Nos. 97-66479, filed Dec. 6, 1997; 98-849, filed Jan. 14, 1998; 98-21401, file Jun. 10, 1998; 98-24157, filed Jun. 25, 1998 and 98-30964, filed Jul. 30, 1998, in the Korean Patent Office, the disclosures of which are incorporated herein by reference. This application also claims the benefit of provisional application 60/067,946 filed on Dec. 8, 1997.

BACKGROUND OF THE INVENTION

1. Field of the Invention

The present invention relates to an optical information processing field in which digitalized information is recorded/reproduced on/from a disc, and more particularly, to a disc cartridge in a drive apparatus for Digital Versatile Disc Random Access Memory (Hereinafter referred to as 'DVD-RAM'), which has a sensor hole to be opened/closed, and to an apparatus and method for driving the same in which the sensor hole is opened/closed in accordance with an opened state of the cartridge and an inspected state of the disc.

Here, the term of the "opened state of the cartridge" means that the disc has been withdrawn from a cartridge case to be used and returned thereto. Further, the term of the "inspected state of the disc" means that the disc returned to the cartridge case has gone through a Certification and/or re-Certification process so that contaminations and defects of the disc are eliminated by the defect managing method suggested in corresponding specifications.

Further, the term "Verification" hereinafter means one of information recording processes in which the newly recorded information is re-read and compared and checked with respect to the previously existing information to confirm that the new information is successively recorded. Also, the term "Certification" hereinafter means the process which detects the defects over a predetermined area or entire area of the disc.

2. Description of the Related Art

Generally, a DVD-RAM driver employs a cartridge to protect a disc from bad outside factors such as scratches, fingerprints, dirts, or the like, and to secure a safe environment for the disc while recording.

As described, employing the cartridge gives an advantage that the disc is protected, while it also brings a shortcoming that a laptop personal computer or the like has a limit in thinness, especially these days when the purchasers demand thinner products.

To meet the demand of the purchasers, i.e., to realize a thinner product, a bare disc itself has to be used. Since the bare disc has no way to be protected from scratches, fingerprints, dirts, etc., the bare disc has to go through the information Verification process in which the recorded information of the disc is verified.

Such a Verification process brings the advantage that temporarily or permanently damaged area of the disc is detected in advance so that safety of the information is promoted. At the same time, however, it also brings the shortcoming that access time of the driver is lengthened due to the presence of the Verification process in which the recorded information is re-read and compared and checked with respect to the previously existing information to confirm that the newly recorded information is successively recorded.

Comparatively, the disc in the cartridge is protected from the scratches, fingerprints, dirts, etc., so that, once the unavailable area of the disc is checked, the recorded information can be further read without going through the Verification process, thereby having still less possible errors. Accordingly, most of the information reproducing apparatuses employ the cartridge, selecting the way of information recording which does not require the Verification process.

According to the Standard DVD-RAM specifications, three types of the cartridges are defined. In the Standard DVD-RAM specifications, the state that the disc has been withdrawn from the cartridge case is additionally defined, and it is defined that such state is detected by a A1 sensor hole. In a double-side disc, there provided A1 and B1 sensor holes corresponding the respective sides of the disc.

The first type cartridge receives a single-side or double-side disc whose withdrawal from the cartridge is not possible once the disc has been received. The second type cartridge receives a single-side disc which can be withdrawn from the cartridge. When the disc is withdrawn from the cartridge, the A1 sensor hole for sensing such a state is opened and never to be closed. Thus, once the disc is withdrawn from the cartridge, such a state is noticeable. The third type cartridge has the A1 sensor hole for sensing the disc withdrawal, which is initially in an open-state. Thus, the disc can be repeatedly withdrawn and returned from/to the cartridge case. Here, the cartridge includes a disc and a cartridge case. Therefore, the cartridge collectively means the cartridge case and the disc received in the cartridge case.

In the Standard DVD-RAM specifications also, it is defined that the second and third type cartridges whose discs have been withdrawn from the cartridge case are put under the same condition of the bare disc. That is, the second type cartridge having the disc once withdrawn from the cartridge case is used under the same condition with the third type cartridge, and since the discs received in these types of cartridges are thus unclear about damage from the scratches, fingerprints, dirts, etc., the disc is put under the same condition with the bare disc. Accordingly, after the recording process, the Verification process is required, and the time for information processing is lengthened.

The Table 1 below shows the three types of cartridges, and open/closed-states of A1 sensor holes respectively corresponding to the cartridges.

TABLE 1

| Cartridge | Initial state | Disc-withdrawal | Disc-returning | Available disc |
| --- | --- | --- | --- | --- |
| 1st type | Closed | Disc not-withdrawn | — | Single & Double-side |
| 2nd type | Closed | Automatically open | Open-state continue | Single-side |
| 3rd type | Open | Open-state continue | Open-state continue | Single-side |

As shown in the above Table, the second and the third type cartridges whose discs have been withdrawn therefrom are put under the same condition with the bare disc, even though the discs are protected in the cartridge case. Thus, the user cannot take advantage of the full benefit of having the cartridges.

More specifically, when the discs in the second and the third type cartridges are withdrawn therefrom for the purpose of disc replacement, the A1 sensor holes for sensing the disc withdrawal are in the open-state. Such opened A1 sensor holes are never to be closed, and accordingly, when the new disc is received in the cartridge and the cartridge is received into the driver, it is determined from the open-state of the A1 sensor hole that the Verification process has to be performed. The problem arises in that even some discs which actually do not require the Verification process have to go through the Verification process, and the time for recording and/or reproducing the information on/from the disc is accordingly lengthened.

SUMMARY OF THE INVENTION

The present invention has been made to overcome the above-mentioned problems, and accordingly it is an object of the present invention to provide a cartridge having a sensor hole to be opened/closed at a user's will so that the disc whose states are verified to the user does not go through the Verification process.

Another object of the present invention is to provide a cartridge driving apparatus and method thereof in the first and the second type cartridges in which the states of the disc are verified through the open-state of the sensor hole and then the sensor hole is subsequently controlled to be closed.

Yet another object of the present invention is to provide a cartridge having such a sensor hole to be opened/closed and a driving apparatus and method thereof.

Additional objects and advantages of the invention will be set forth in part in the description which follows and, in part, will be obvious from the description, or may be learned by practice of the invention.

In order to accomplish above and other objects of the present invention, the cartridge includes a cartridge case for receiving a disc, at least one sensor hole for sensing whether the disc has been withdrawn from the cartridge case or not, and means for opening/closing the sensor hole in accordance with the states of the disc.

Here, the cartridge is the first or the second type cartridge defined in the standard DVD-RAM specifications, and the disc available for the cartridge is a single or double-side disc. The state of the disc means the opened state of the cartridge and the inspected state of the disc.

According to a first preferred embodiment of the present invention, the cartridge has a cartridge case for receiving a disc, and an opening cover separably mounted to a rear side of the cartridge case while supporting the disc. At least one sensor hole is formed at the cartridge case to sense whether the disc has been withdrawn from the cartridge case or not. The sensor hole is opened/closed by a sensor lever in accordance with the open state of the cartridge and/or inspected state of the disc. The sensor lever is disposed at the opening cover, and has an opening/closing member disposed at the sensor hole of the cartridge case, and a tension member in contact with an inner side surface of the cartridge case and thereby giving a predetermined degree of tension thereto and positioning the opening/closing member of the sensor lever toward the open-position of the sensor hole.

Further, the cartridge according to the present invention has a locker for fixedly supporting the opening/closing member. The locker has such a structure that the opening/closing member is shifted from the open-position to the close-position when the outside force exceeding a predetermined force is exerted thereto, while the locker substantially supports the opening/closing member so as to prevent the opening/closing member from being returned to the open-state by the returning tension of the tension part of the sensor lever.

According to another preferred embodiment of the present invention, the cartridge has a cartridge case for receiving a disc, an opening cover separably mounted to a rear side of the cartridge case while supporting the disc so that the disc can be withdrawn/received from/into the cartridge case, an A1 sensor hole never to be re-opened/re-closed for sensing whether the disc has been withdrawn from the cartridge case or not, a second sensor hole for indicating whether the disc has been withdrawn from the cartridge case or not, and means for opening/closing the second sensor hole in accordance with the state of the disc.

The A1 sensor hole is vertically defined through the upper and lower portions of the cartridge case, and so is the second sensor hole. A horizontal sensor hole is formed intercommunicating with the A1 sensor hole and the second sensor hole. Thus, both the driver having vertical sensor switches and the driver having horizontal sensor switches can utilize the cartridge.

An A3 sensor hole defined in the Standard DVD-RAM specifications can substitute for the second sensor hole. In this case, the means for opening/closing the sensor hole has an opening/closing member, a tension rib, and locking means. The opening/closing member is movably disposed at the opening cover, while corresponding to the A3 sensor hole and moved to an open or close position of the A3 sensor hole, thereby selectively opening the A3 sensor hole. The tension rib elastically supports the opening/closing member which has been moved to the open position of the A3 sensor hole. The locking means fixedly supports the opening/closing member which has been moved to the open position of the A3 sensor hole. The locking means has a locking projection protruded from an upper side of the opening/closing member, and a locking portion formed at an inner side of the cartridge case corresponding to the locking projection.

The opening/closing member of the sensor hole opening/closing means may extend over to the position of the A1 sensor hole. And in this case, a space corresponding to the A1 sensor hole is defined at the extended portion of the opening/closing member. Also, a tap for covering the A1 sensor hole is disposed at the space, while positioned either to an inner circumference of the space or the cartridge case. The opening/closing member is only moved in absence of the tap.

Here, the A3 sensor hole is always in a closed state when the A1 sensor hole is closed, while the A3 can be either in open state or in closed state when the A1 sensor hole is opened. Also, when the A3 sensor hole is in closed state, it means the Verification process is required while recording, while the opening of A3 sensor hole means that the Verification process is not required while recording.

When the A3 sensor hole in the Standard DVD-RAM specifications is employed as the second sensor hole, the A3 sensor hole may be positioned adjacently to a recording-prevention sensor hole, and the two sensor holes may be subsequently opened/closed. In this case, the sensor hole opening/closing means has left and right locking portions and a sensor lever. The left and right locking portions are formed adjacently to outer side ends of the A3 sensor hole and the recording-prevention sensor hole on the cartridge case. The sensor hole opening/closing means controls one of A1 and second sensor holes to the closed-state by means of the corresponding locking portion. When the sensor lever is not effected by the tension, the sensor lever is positioned at the middle position so that both of the A1 and second sensor holes are kept in the closed-state.

The sensor lever has an opening/closing member and a tension lever. The opening/closing member is capable of covering both of the adjacently formed A3 sensor hole and the recording-prevention sensor hole. The tension lever is disposed on the opening cover while supporting the opening/closing member, to return the opening/closing member to a corresponding position when the opening/closing member is opened/closed. The sensor lever has such a structure that the tension lever is automatically returned to the middle position upon re-closing of the opening cover.

Here, when the recording-prevention sensor hole is in the open-state, the A3 sensor hole is not effected therefrom, while the A3 sensor hole is either in the open-state or in the closed-state when the recording-prevention sensor hole is in the closed-state. In this case, the closed-state of the A3 sensor hole means that the Verification process is required while recording, while the open-state of the A3 sensor hole means that the Verification process is not required while recording.

According to yet another preferred embodiment of the present invention, the cartridge has a cartridge case, an opening cover separably mounted to a rear side of the cartridge case to support the disc with respect to the cartridge case so that the disc can be withdrawn/received from/in the cartridge case, an oval sensor hole formed by integrating an open-state sensor hole and a recording-prevention sensor hole for sensing whether the disc has been withdrawn from the cartridge case or not, left and right locking portions adjacently formed at respective both sides of the oval sensor hole, and a sensor lever for controlling one or both of the open-state and recording-prevention sensor holes of the integrated oval sensor hole to a closed-state by means of respective corresponding locking portions. Also, the sensor lever controls both of the open-state and recording-prevention sensor holes to a closed-state while being positioned at a middle position when the sensor lever is not effected by the tension.

Another object of the present invention is accomplished by a method for driving a cartridge having the sensor hole to be opened/closed having steps of, (a) determining from an open/closed state of a sensor hole whether the sensor hole indicates a first state, i.e., whether there has been the disc withdrawal from the cartridge, (b) performing a Certification process when the sensor hole is in the first state, (c) controlling the sensor hole for a Verification process upon completion of the Certification process.

According to the preferred embodiment of the present invention, the method for driving the cartridge further includes a step (d) of recording information on the disc in the absence of a Verification process upon completion of the step (c).

According to another preferred embodiment of the present invention, the method for driving the cartridge further includes a step (e) of recording the information while performing the Verification process in absence of the Certification process when the sensor hole is in the first state.

Further, the step (a) may include an additional step (a1) of informing a user that he may accelerate the information processing process by setting the sensor hole in the first state and performing the Certification process.

The Certification process is performed while maintaining previously existing information in the step (b), and if the area of defects exceeds the predetermined extent, an additional step (b1) of recommending a disc cleaning of the disc to the user may be included.

Also, the step (c) may further include a step (c1) of recommending to the user that he may accelerate the information processing process by setting the sensor hole at the inspected state, thereby not going through the Verification process. Here, the "inspected state" is a second state in which the sensor hole senses that the disc has not been withdrawn from the cartridge.

In the driving method described above, when the sensor hole is the A1 sensor hole of the Standard DVD-RAM specifications, the first state means the open-state and the second state means the closed-state of the A1 sensor hole.

Further, when the sensor hole is the one having the A1 sensor hole which senses the disc withdrawal from the cartridge case, and is not to be re-opened/re-closed, then the first state means the closed-state and the second state means the open-state.

Still further, when the A1 sensor hole is the one formed adjacently to the recording-prevention sensor hole of the Standard DVD-RAM specifications and is to be controlled by one sensor lever to be open/closed, then the first state means the closed-state and the second state means the open-state.

Meanwhile, the method for driving the cartridge according to the preferred embodiments of the present invention further includes a step (f) of preferentially preventing the recording as the result of giving a priority to the open-state of the recording-prevention sensor hole over the state of the A1 sensor hole.

Another object of the present invention is accomplished by an apparatus for driving the cartridge having a sensor hole to be opened/closed having a first sensor switch and a second sensor switch. The first sensor switch is turned 'on/off' by being selectively inserted into a first sensor hole of the cartridge so that the first sensor switch indicates open/closed-states of the first sensor hole by applying a predetermined signal to a microcomputer. The second sensor switch is turned 'on/off' by being selectively inserted into a second sensor hole of the cartridge which indicates open/closed-states of the cartridge so that the second sensor switch indicates open/closed-states of the second sensor hole by applying the predetermined signal to the microcomputer. Accordingly, when the first sensor hole is in the closed-state, then it is determined that the disc has been withdrawn from the cartridge case, so that the notice for performing the Certification process is generated. Further, when the state of the second sensor hole is determined that it is in the closed-state while the first sensor hole is in the open-state, then it is determined that the disc has been withdrawn from the cartridge case and that there has been no proper process performed, so that the recording is performed along with the Verification process. When the second sensor hole is in the open-state, then it is determined that the disc has been withdrawn from the cartridge case and that there has been proper processing (a defects check and cleaning) so that the recording is performed without the Verification process.

BRIEF DESCRIPTION OF THE DRAWINGS

The above and other objects and advantages will be more apparent by describing preferred embodiment in greater detail with reference to the accompanying drawings, in which.

DESCRIPTION OF THE PREFERRED EMBODIMENTS

Figure 1:
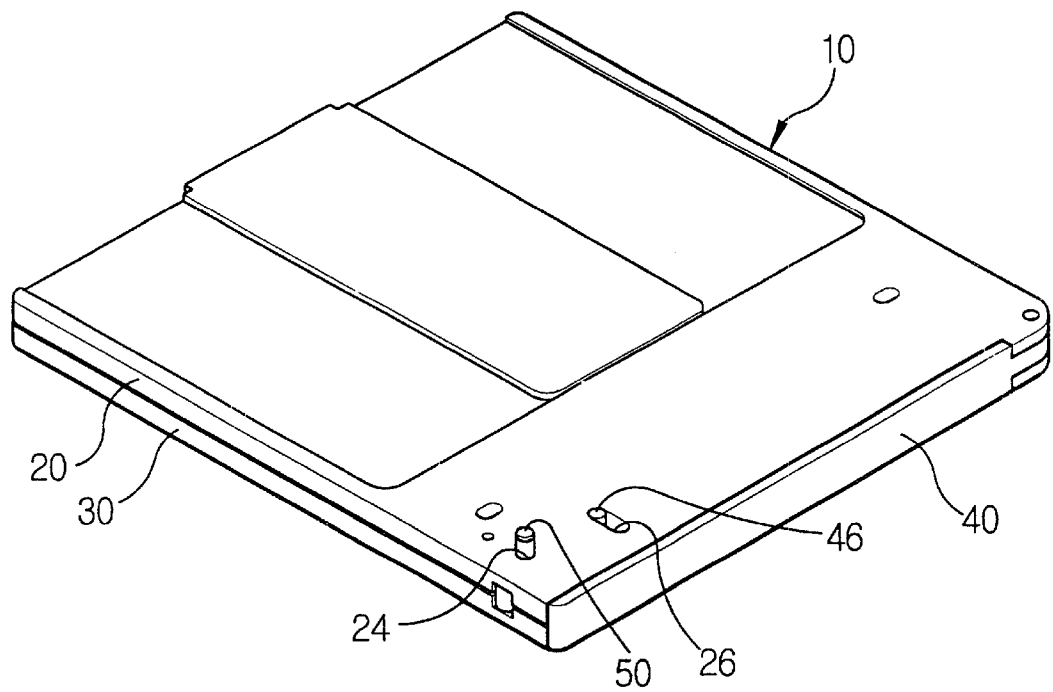
FIG. 1 is a perspective view showing a cartridge according to a first preferred embodiment of the present invention which is assembled.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
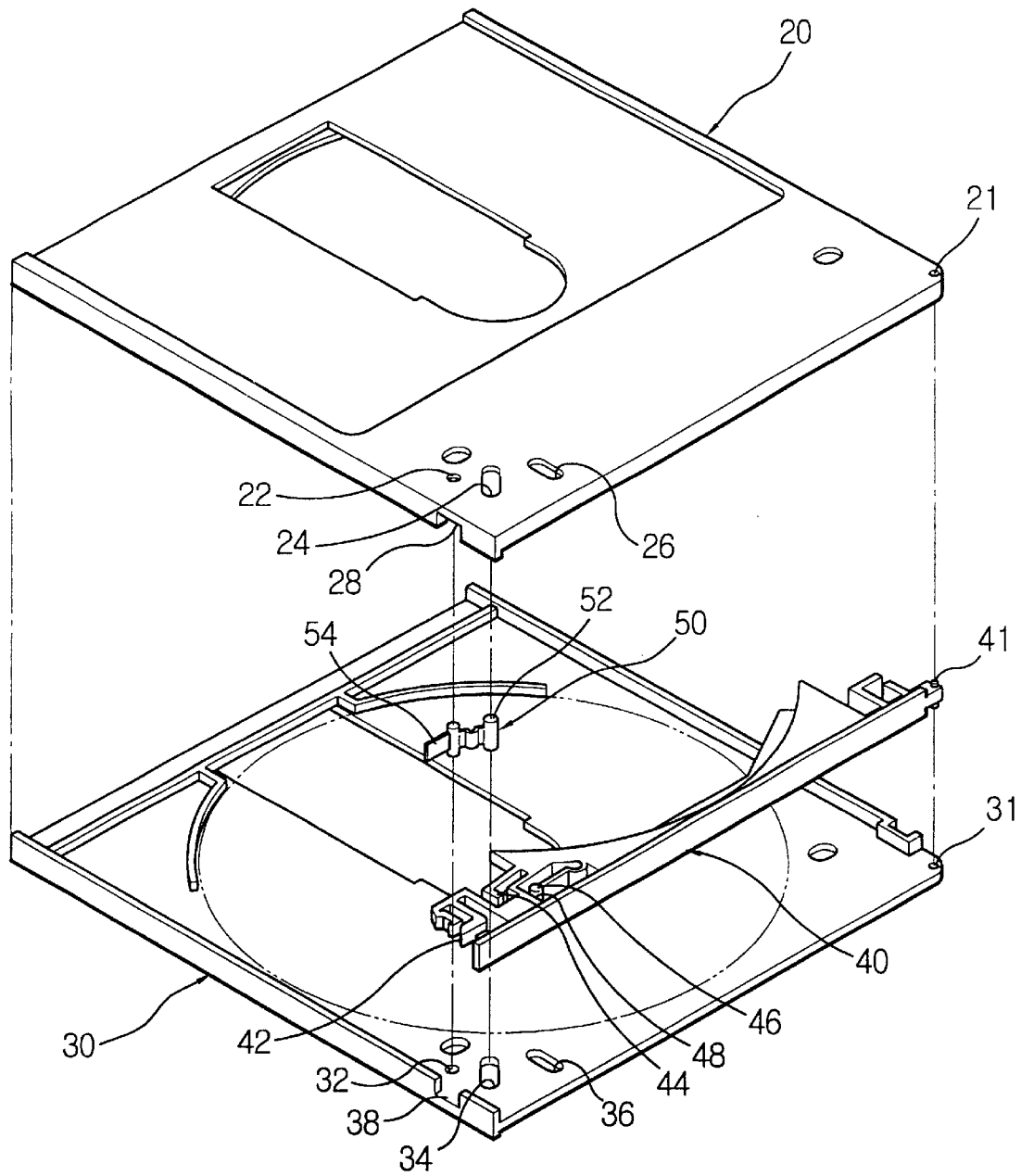
FIG. 2 is an exploded perspective view showing the cartridge according to the first preferred embodiment of the present invention, in which the assembling relations of the components are shown.

FIG. 1 is a perspective view showing a cartridge according to a first preferred embodiment of the present invention being assembled, and FIG. 2 is an exploded perspective view showing a cartridge according to the first preferred embodiment of the present invention, in which the assembling relations of the components are shown.

In FIGS. 1 and 2, a reference numeral 10 is a cartridge case which has an upper shell 20 and a lower shell 30. Further, the reference numeral 40 is an opening cover, and 50 is a sensor lever.

In FIG. 1, the positions of an A1 sensor hole 24, the sensor lever 50 for opening/closing the A1 sensor hole, and the opening cover 40 for withdrawing a disc from the cartridge case 10 are respectively shown. The A1 sensor hole 24 has an oval shape, and has a unique feature differing from the conventional cartridge in that the A1 sensor hole 24 is opened/closed by means of the sensor lever 50. A protect lever 46 functions to open/close a recording-prevention sensor hole 26. The recording-prevention sensor hole 26 is generally employed to prevent a user's mistakes such as information-deleting or information-overwriting.

Referring to FIG. 2, the opening cover 40 is assembled to the cartridge case 10 by its rotary shaft 41 rotatably inserted through support holes 21 and 31 which are respectively formed at the upper shell 20 and the lower shell 30. Thus, the opening cover 40 is pivotably opened/closed while being assembled to the cartridge case 10.

The sensor lever 50 is assembled through sensor lever support holes 22 and 32 respectively formed at the upper and the lower shells 20 and 30. The sensor lever 50 has an opening/closing member 52 and a tension member 54. The opening/closing member 52 is positioned at the A1 sensor hole 24 (which is coincident with an A1 sensor hole formed in the lower shell 30), while the tension member 54 contacts with side surfaces of the upper and the lower shells 20 and 30. The tension member 54 is in contact with the side surfaces of the upper and the lower shells 20 and 30, thereby giving a tension of a predetermined degree to the sensor lever 50. Thus, in the event that the opening cover 40 is not assembled or opened, the opening/closing member 52 is shifted to the open-position in which the A1 sensor holes 24 and 34 are in the open-state.

Meanwhile, the opening cover 40 has a first and a second locker 42 and 44. The first locker 42 functions to lock the opening cover 40 in cooperation with respective locking holes 28 and 38, so that the opening cover 40 does not open under a normal condition. When the user needs to open the opening cover 40 to get the disc received therein, the user pushes the first locker 42 through the locking holes 28 and 38 toward an inner portion of the opening cover 40, whereby unlocking the locking state of the opening cover 40. Thus, the opening cover 40 can be opened with respect to the cartridge case 10.

Figure 3:
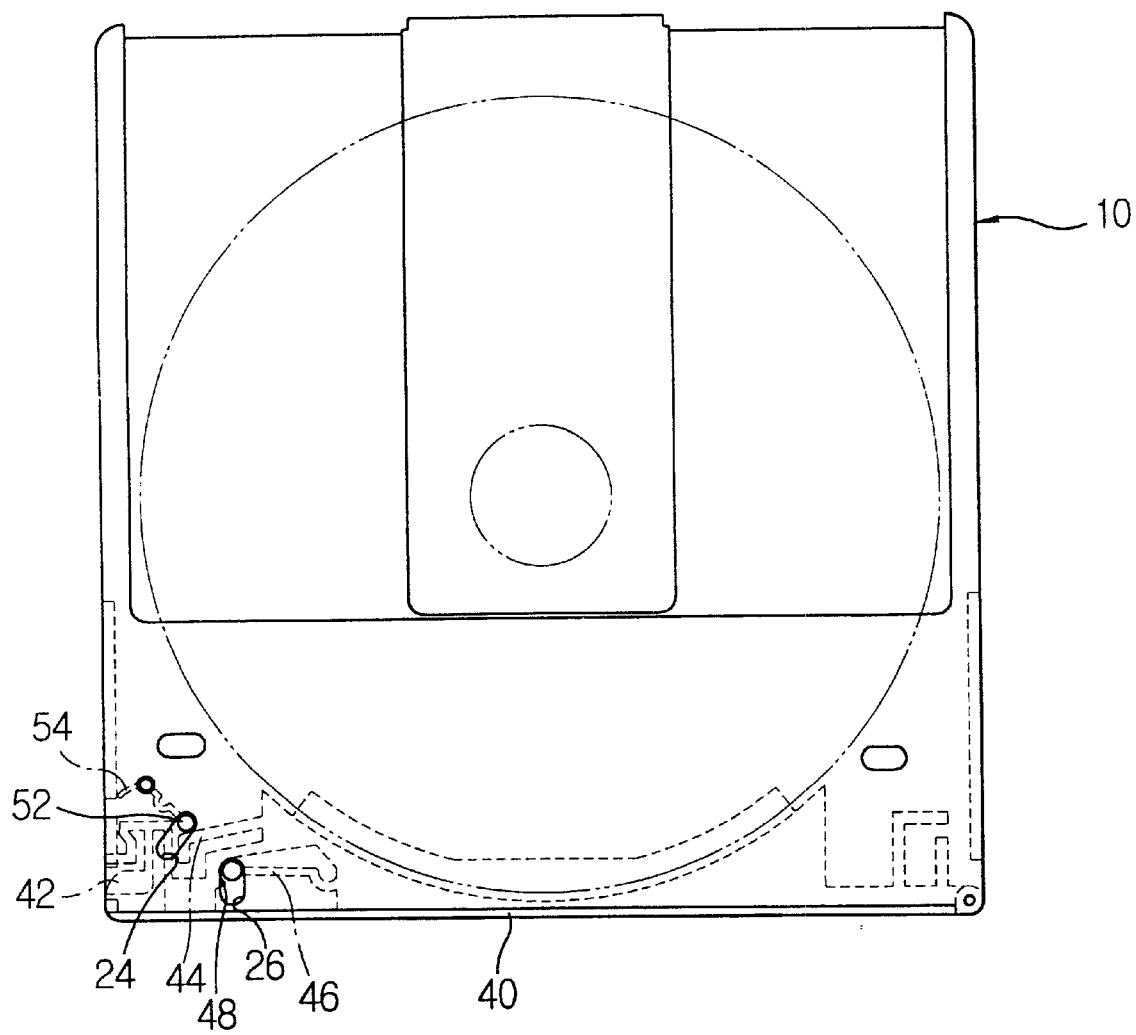
FIG. 3 is a plan view showing the cartridge of FIG. 2 whose opening cover is closed.

Further, in a state that the opening cover 40 is in the closed-state, and the opening/closing member 52 is shifted to the close-position, the second locker 44 functions to support the opening/closing member 52 with a predetermined degree of force, by means of a bent portion thereof which is shown in FIG. 3. The bent portion is formed approximately at a middle portion of the A1 sensor hole 24. Thus, the opening/closing member 52 is not returned to its initial position by a returning force of the tension member 54.

Figure 4:
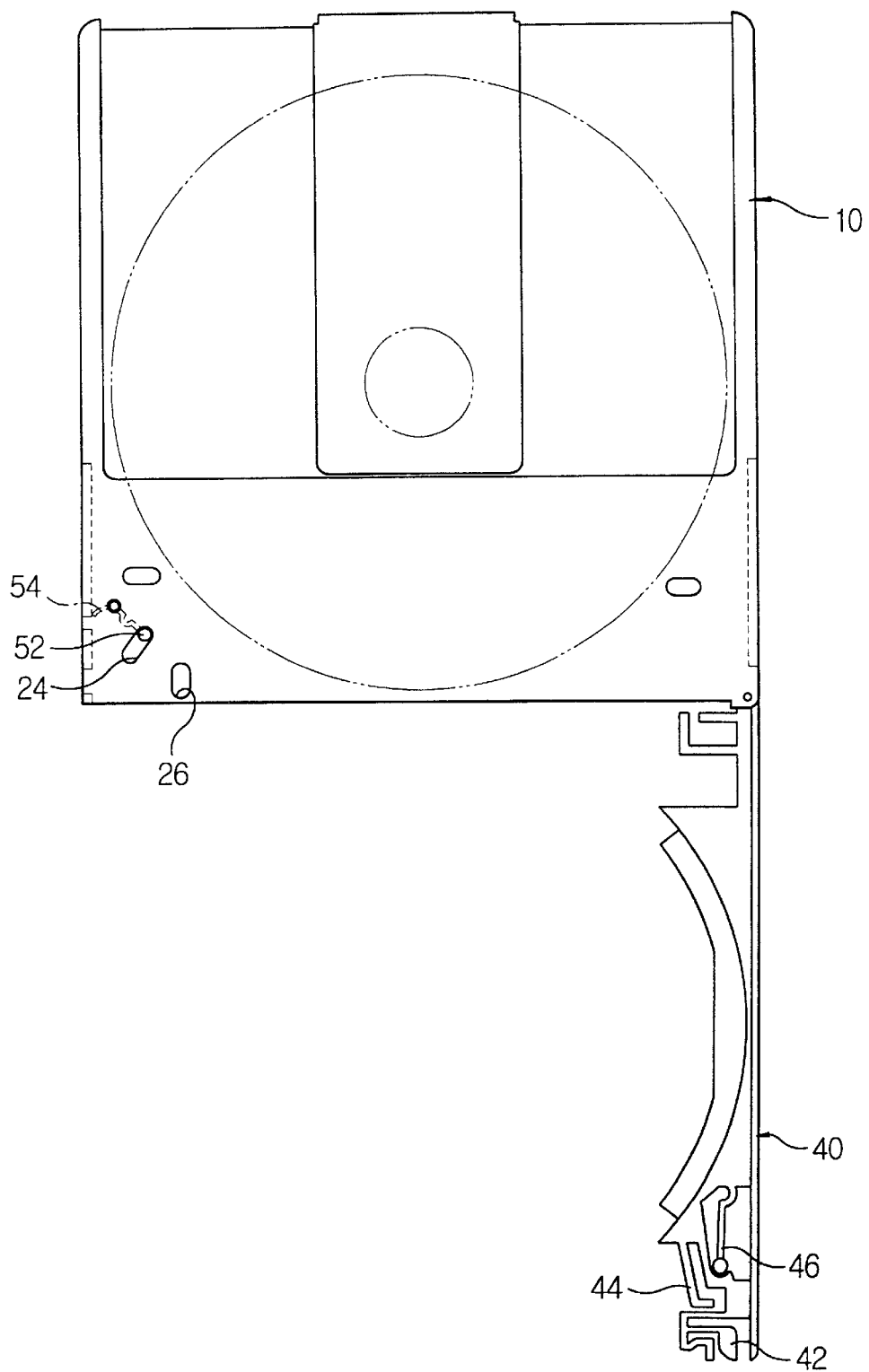
FIG. 4 is a plan view showing the cartridge of FIG. 2 whose opening cover is opened.

FIG. 4 shows the opening/closing member 52 of the sensor lever 50 when the opening cover 40 is in the open-state.

Meanwhile, as shown in FIG. 2, the protect lever 46 having elasticity incorporates with a locking portion 48 in order to close or open a recording-prevention sensor hole 26.

It should be noted that such a structure for opening/closing the A1 sensor hole 24 shown in FIG. 2 is one of various possible embodiments. There could be additional embodiments such that the A1 sensor hole (or B1 sensor hole) of the double-side disc is automatically opened, and the user manually closes the opened sensor hole after the Certification process in which the possible defects of the disc are checked.

As described, according to the cartridge of the present invention, the state of the A1 sensor hole is automatically shifted to the open-state when the opening cover of the cartridge case is opened, and maintains such an open-state even when the opening cover is closed again. Also, since the user can shift the position of the A1 sensor hole to the closed-state after the Certification or re-Certification process, the information recording speed deterioration resulting from the presence of a Verification process is prevented.

More specifically, the information recording speed can be enhanced by having the second and the third type cartridge whose physical shapes and functions are same, while the second type cartridge is re-defined as the cartridge which does not require the Verification process during recording, and the third type cartridge is re-defined as the cartridge which has to go through the Verification process while recording. Here, the third type cartridge has a condition that the information can be recorded without the Verification process, and a structure through which the user can re-close the A1 sensor hole when the Non-Verification condition is satisfied.

Here, the Non-Verification condition of the present invention is that the disc has been once withdrawn from the cartridge case 10. The Table 2 below shows such states described above.

TABLE 2

| Cartridge | Initial state | Disc-withdrawn | Disc-returned | Post-Verification |
|---|---|---|---|---|
| 1st type | Closed | Disc-not-withdrawn | — | Closed-state continue |
| 2nd type | Closed | Automatically opened | Open-state continue | Closed by user |
| 3rd type | Open | Open-state continue | Open-state continue | Closed by user |

To overcome the problem of recording delay of the conventional second and the third type cartridges (whose disc has been withdrawn), due to the presence of the Verification process (as described, the disc in this cartridge case is put under the same condition of the bare disc), the user manually closes the open A1 sensor hole after the Verification of the disc, which is in the open-state after withdrawal of the disc, so that the information is recorded on the disc under the same condition with the second type cartridge whose disc has not been withdrawn. Such is described in greater detail with respect to FIG. 5.

Figure 5:
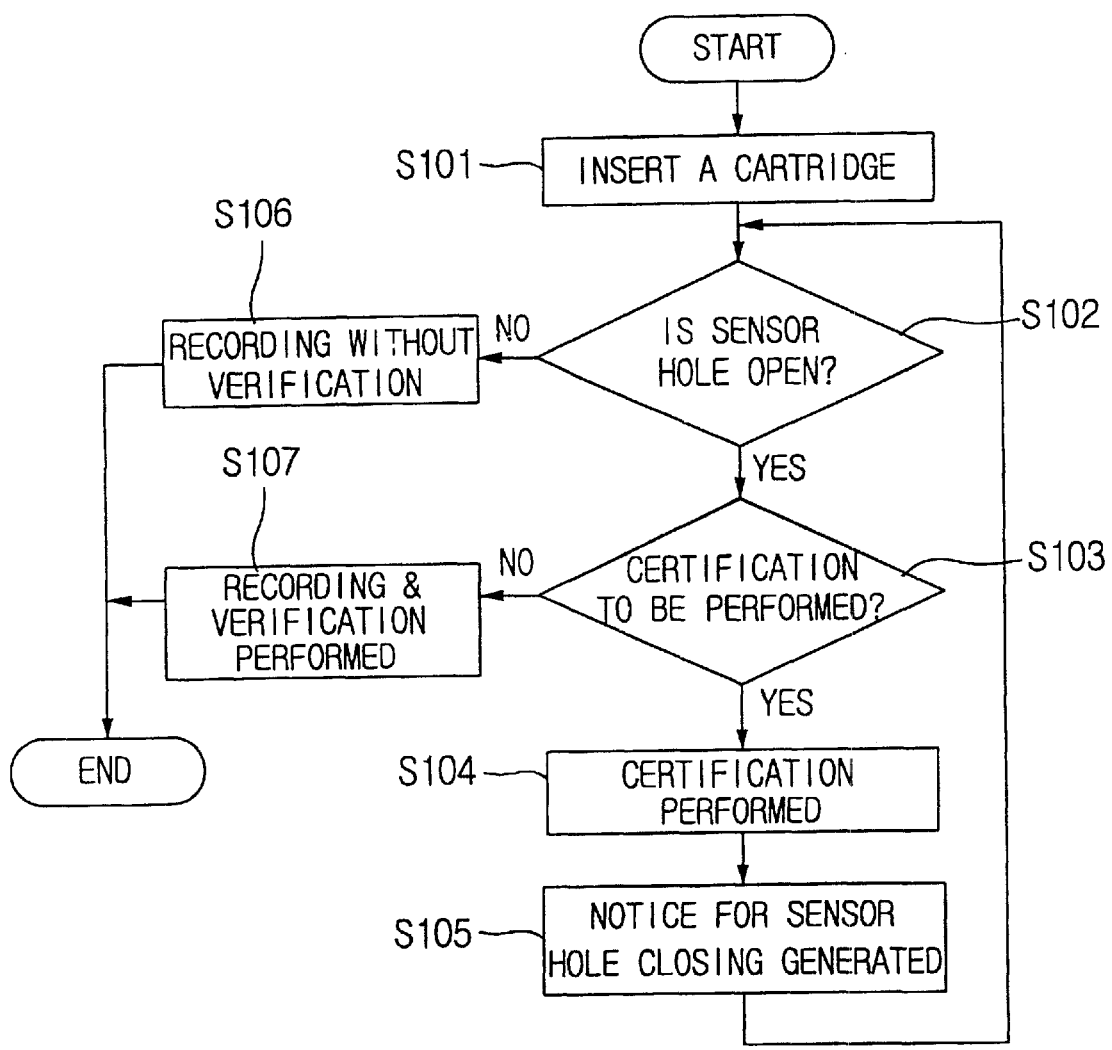
FIG. 5 is a flow chart for explaining a method for driving the cartridge having a sensor hole to be opened/closed according to the first preferred embodiment of the present invention.

Referring to FIG. 5, the cartridge whose disc has been once withdrawn therefrom and returned thereto is inserted into the driver (Step 101). Then, it is determined whether the A1 sensor hole is in the open-state or closed-state (Step 102). In the Step 102, if the A1 sensor hole is in the open-state, it is determined whether the Certification process has to be performed (Step 103), and then the Certification process is performed (Step 104).

The Certification process of the present invention is performed in a particular format suggested by the Standard DVD-RAM specifications. In this situation, the Certification process is not an Initialization process in which the previously existing information is ignored, but the re-Certification process in which the existing information is maintained. Further, in Step 104 of performing the re-Certification process, when the defects of the disc exceed a predetermined extent, there can be an additional step of informing the user of such a state and recommending to the user to eliminate such defects in a proper way. Further description on the processes and method about the re-Certification process will be omitted, since it will be easily understood by a person skilled in the art.

Also, in Step 102, when the cartridge whose A1 sensor hole is in the open-state is inserted, a step of recommending to the user that he may accelerate the processes by performing the re-Certification process, can be additionally included.

After the re-Certification process, the information is generated to recommend that the user may shift the state the A1 sensor hole to the close-state, so that he may accelerate the information processing processes due to the absence of the Verification process (Step 105).

Meanwhile, in Step 102, when the A1 sensor hole is in the closed-state, the recording process is performed without the Verification process (Step 106). Also, in Step 103, when the A1 sensor hole is in the open-state and the Certification process has not been performed, the information recording process along with the Verification process is performed (Step 107). The Step 107 is for the third type cartridge.

As described above, according to the cartridge of the present invention, under certain circumstances, the Verification process is not performed while recording, even when the disc withdrawn from the second type cartridge is re-inserted into the drive without being received in the cartridge, i.e., as the bare disc, or when the disc used as the bare disc is received into the cartridge (third type cartridge). More specifically, provided that the user eliminates the contaminants such as dirts, fingerprints, or the like according to the instructions suggested by the manufacturer before he inserts the disc into the cartridge case, and provided that he keeps a record of contaminants occurring while the disc was used as bare disc and left or eliminated in accordance with the defect managing method suggested in the Standard DVD-RAM specifications, the user can re-close the A1 sensor hole so that the information can be recorded on the disc without the Verification process. Accordingly, delay of information processing due to the unnecessary presence of the Verification process can be prevented.

As above, the A1 sensor hole of the Standard DVD-RAM specifications has been described. The object of the present invention, however, can be also achieved by a new sensor hole, or an A3 sensor hole which is defined by the Standard DVD-RAM specifications. (The function of the A3 sensor hole is not specified in the Standard DVD-RAM specifications.) Employing the new sensor hole or the A3 sensor hole brings the advantage that the function of the A1 sensor hole for sensing the initial state of the cartridge is maintained, while the user can determine whether the disc can be used without the Verification process.

Hereinafter, a cartridge employing a new sensor hole, i.e. the A3 sensor hole will be described in greater detail.

Figure 6:
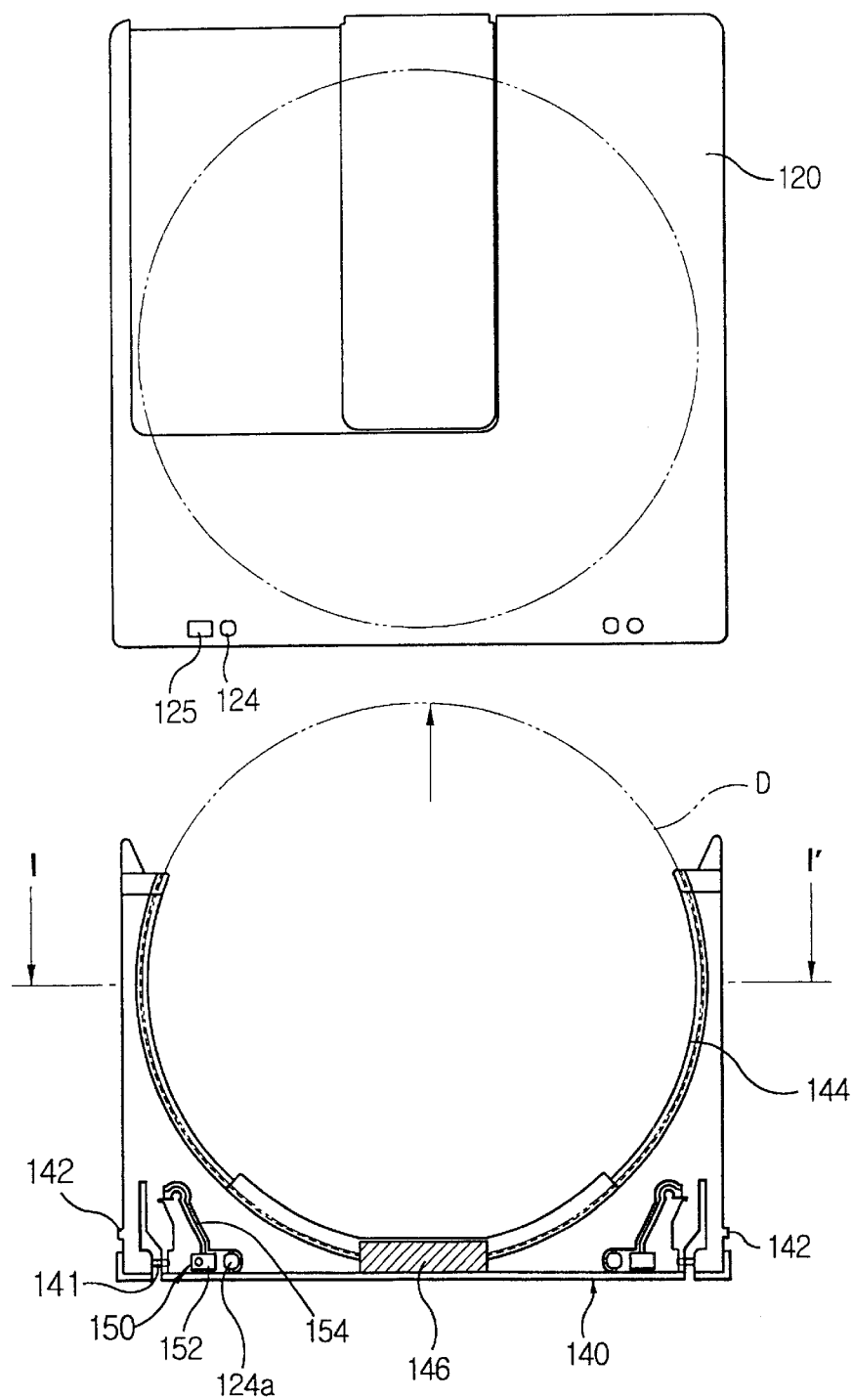
FIG. 6 is a plan view showing a cartridge having a sensor hole to be opened/closed according to a second preferred embodiment of the present invention, in which the opening cover is separated therefrom.
Figure 7:
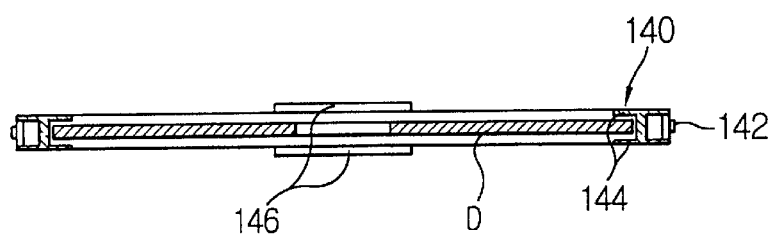
FIG. 7 is a sectional view taken along the line I—I of the opening cover of the cartridge of FIG. 6.
Figure 8:
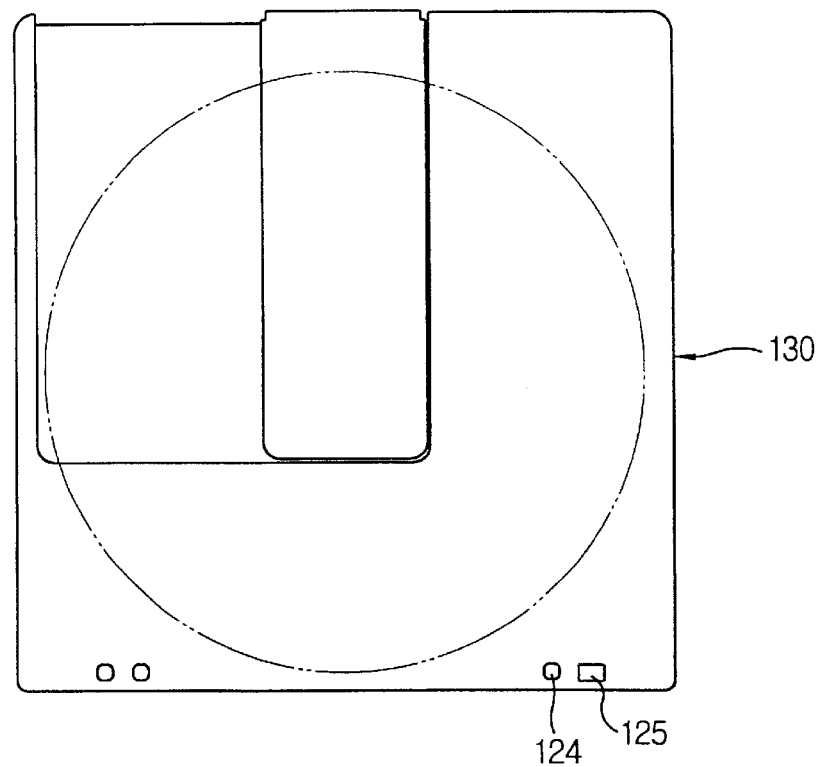
FIG. 8 is a plan view of a lower shell of the cartridge of FIG. 6, showing the sensor hole.
Figure 9:
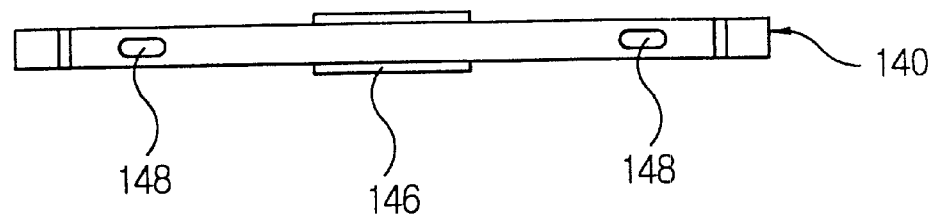
FIG. 9 is a front elevation of the opening cover of the cartridge of FIG. 6, showing the sensor hole as a horizontal sensor hole instead of as a vertical sensor hole.
Figure 10A:
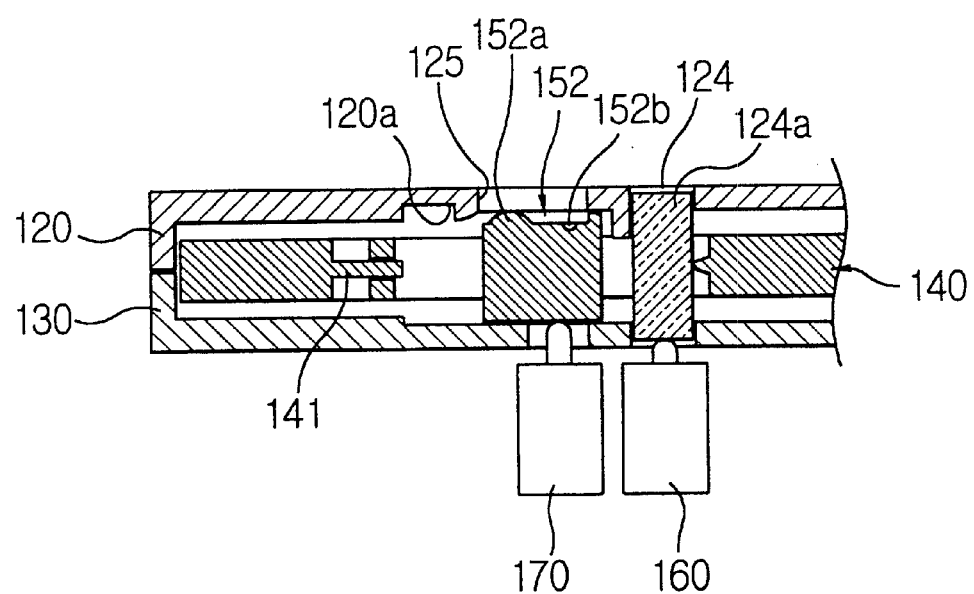
FIGS. 10A, 10B, and 10C are sectional views for showing the operating relations of the means for opening/closing the sensor hole, when vertical sensor switches are used in the cartridge of FIG. 6.
Figure 10B:
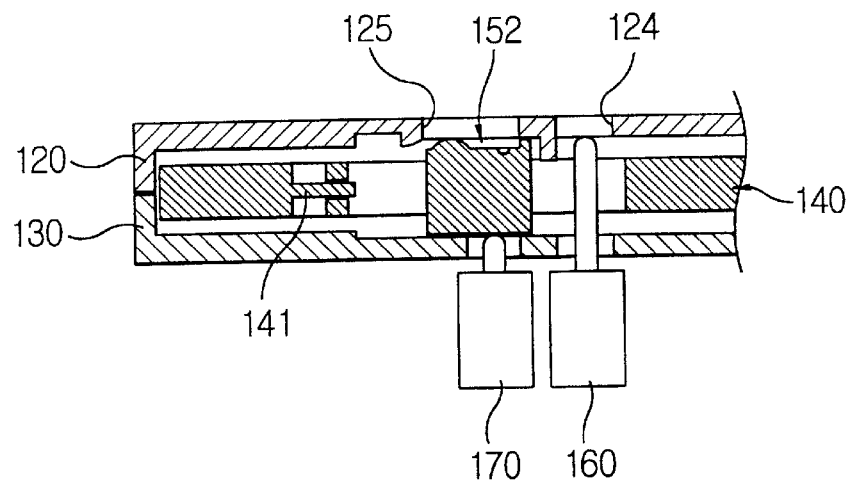
Figure 10C:
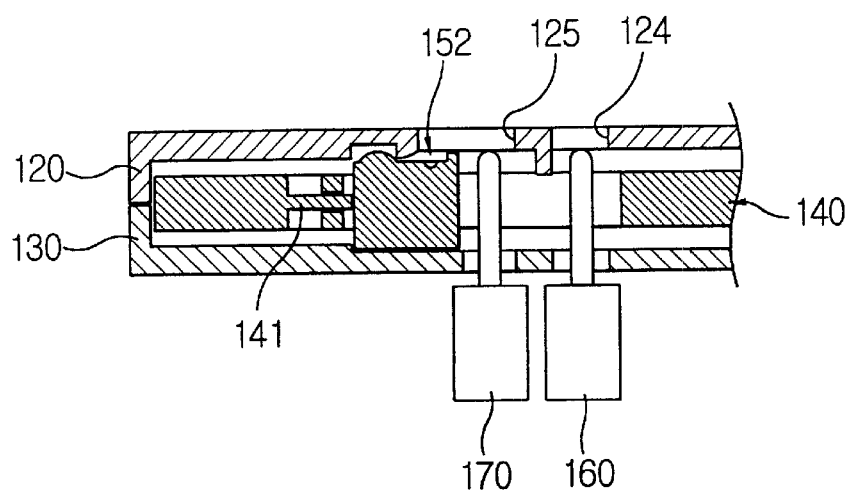

FIG. 6 shows the cartridge having the A3 sensor hole to be opened/closed according to the second preferred embodiment of the present invention. FIG. 7 is a sectional view taken along the line I—I of the cartridge of FIG. 6 to show the opening cover, FIG. 8 is a plan view of a lower shell of the cartridge of FIG. 6, showing the sensor hole, and FIG. 9 is a front elevation of the opening cover of the cartridge of FIG. 6, showing the sensor hole as a horizontal sensor hole instead of a vertical sensor hole as in FIG. 6. FIGS. 10A, 10B, and 10C are sectional views for showing the means for opening/closing the vertical sensor hole of the cartridge of FIG. 6 in operation.

Reference numerals 120 and 130 in the figures respectively denote an upper shell and a lower shell. 140 is an opening cover, and 150 is a sensor cover. Additionally, reference numeral 124 is an A1 sensor hole, and 125 is an A3 sensor hole.

The A1 and A3 sensor holes 124 and 125 are respectively defined through the upper and lower shells 120 and 130 of the cartridge case. The A1 sensor hole 124 has a circular shape, while the A3 sensor hole 125 has a rectangular or oval shape.

A tap 124a is disposed at the A1 sensor hole 124, breakable with an outside force. The tap 124a is not-recoverable once it is broken. Accordingly, the absence of the tap 124a indicates that the disc has been withdrawn from the cartridge.

The A3 sensor hole 125 is to be selectively opened/closed by the sensor lever 150. The sensor lever 150 has an opening/closing member 152 and a tension rib 154. The opening/closing member 152 is movably disposed between the close-position and the open-position of the A3 sensor hole 125, and the tension rib 154 supports the opening/closing member 152.

Here, the opening/closing member 152 is elastically supported by the tension rib 154 to maintain the closed-state of the A3 sensor hole 125. A locking projection 152a is formed at an upper side of the opening/closing member 152, while there is formed a locking portion 120a corresponding to the locking projection 152a at the upper shell 120. Due to the presence of the locking projection 152a and the locking portion 120a, the opening/closing member 152 which is shifted to the open-position of the A3 sensor hole 125 maintains the position thereof. Additionally, a recess 152b is formed at the other upper side of the opening/closing member 152, to move the opening/closing member 152.

Further, a returning lever 141 is disposed at the opening cover 140 which is adjacent to the outer side of the opening/closing member 152. Subsequent to the opening movement of the opening cover 140, the returning lever 141 pulls the opening/closing member 152, thereby shifting the opening/closing member 152, which was moved to the open-position of the A3 sensor hole 125, to the close-position. Accordingly, when the opened opening cover 140 is closed again, the opening/closing member 152 is automatically returned to the close-position of the A3 sensor hole 125, which is the initial position of A3 sensor hole 125.

Meanwhile, the opening cover 140 is fixedly mounted to the cartridge case by a pair of locking projection parts 142 provided at both sides thereof which are locked with the locking recesses 111 provided at both sides of the cartridge case. The opening cover 140 is withdrawn from the cartridge case if the locking projection parts 142 at both sides thereof are pushed inward and pulled outside.

A guide rib 144 is disposed around the opening cover 140 to securely support the disc. Further, a label part 146 is formed at a front middle portion of the opening cover 140, so that characters or symbols can be written thereon. For example, the alphabet A and B can be written so as to denote each side of the disc. Accordingly, errors such as disc turn-over are prevented.

Respectively, the A1 sensor hole, A3 sensor hole, and means for opening/closing sensor holes are symmetrically formed at both sides of the cartridge case. Like the general disc cartridge, the disc cartridge has a pair of positioning pins for determining the position of the cartridge inserted into the driver, and recording-prevention sensor holes for preventing information deleting or overwriting. And since such elements are general elements for the disc cartridge, the further detailed depiction and description thereof will be omitted.

As described, the A1 and A3 sensor holes 124 and 125 are respectively defined through the upper and the lower shells 120 and 130 of the cartridge. Additionally, as shown in FIG. 9, horizontal sensor holes 148 are formed at front surfaces of the opening cover 140 in perpendicular relation with respect to the sensor holes 124 and 125, while intercommunicating with the A1 and A3 sensor holes 124 and 125. Thus, both of the driver having vertical sensor switches as well as the driver having horizontal sensor switches can use the cartridge.

Hereinafter, the operation of the disc cartridge constructed as above according to the second preferred embodiment of the present invention will be described with respect to FIGS. 10A and 10C.

FIG. 10A shows the state that the cartridge received with the new disc is inserted into the driver. As shown, the A1 and A3 sensor holes 124 and 125 are in the closed-state respectively by the tap 124a and the opening/closing member 152, and accordingly, the sensor switches 160 and 170 are not inserted into the A1 and A3 sensor holes 124 and 125. In this case, it is determined that the disc is the new disc which has never been withdrawn from the cartridge, so that the recording process excluding the Verification process is performed.

FIG. 10B shows the state when the disc in the cartridge case has been replaced. As shown in FIG. 10B, the tap 124a which has been covering the A1 sensor hole 124 is eliminated. Thus, the sensor switch 160 of one side is inserted into the A1 sensor hole 124. Thus, it is determined that the disc has been withdrawn from the cartridge case. Also, from the closed-state of the A3 sensor hole, it is determined that there has been no proper process performed, so that the Verification process is performed while recording.

In this state, when the defects of the replaced disc are detected, the opening/closing member 152 is forcibly moved by an outside force to the open-position of the A3 sensor hole 125 as shown in FIG. 10C. Then, the sensor switch 170 of the driver is inserted into the opened sensor hole 125, and accordingly, it is determined that the disc has been withdrawn from the cartridge case and there has been proper process performed. Thus, the recording is performed without the Verification process.

As described above, according to the disc cartridge of the present invention, since the information is recorded while only the required process is performed, the information processing can be much more accelerated, in comparison with the conventional way in which the Verification process is unconditionally performed whenever the disc is replaced.

As above, the situation when the driver having vertical sensor switches is inserted into the cartridge having A1 and A3 sensor holes to be opened/closed according to the present invention is described. The cartridge of the present invention, however, can be employed into the driver which has horizontal sensor switches as well.

Figure 11A:
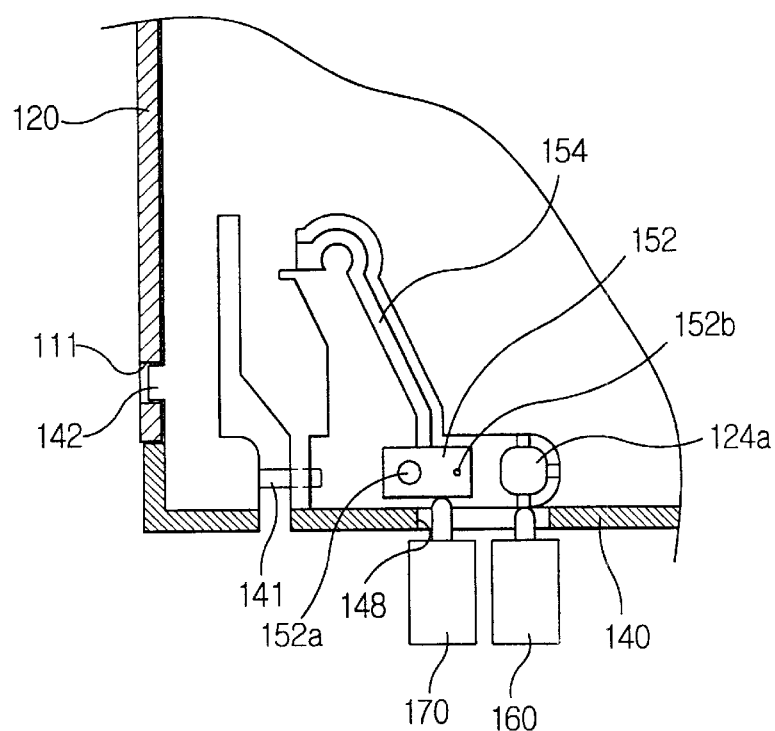
FIGS. 11A, 11B, and 11C are sectional views for showing the operating relations of the means for opening/closing the sensor hole, when horizontal sensor switches are used in the cartridge of FIG. 6.
Figure 11B:
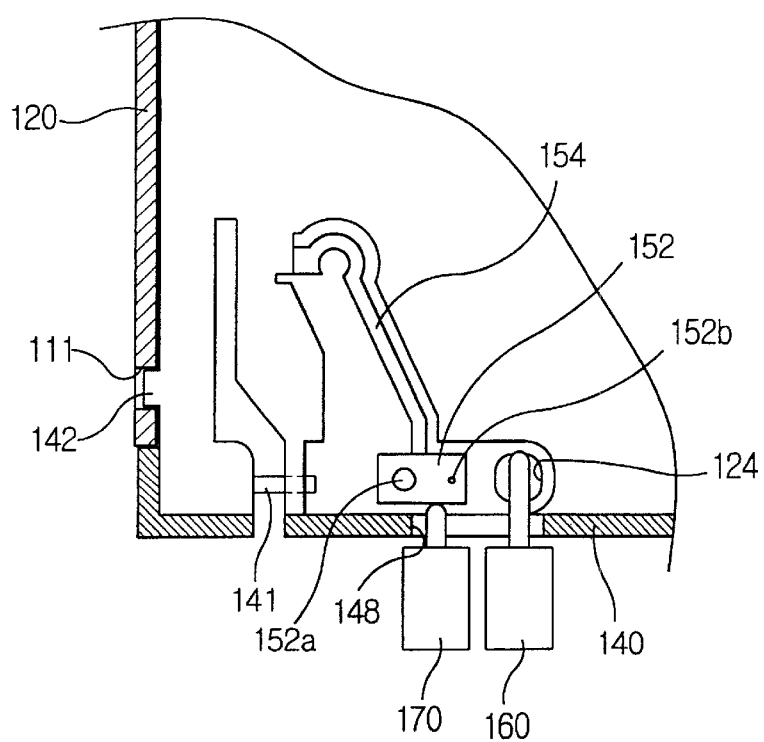
Figure 11C:
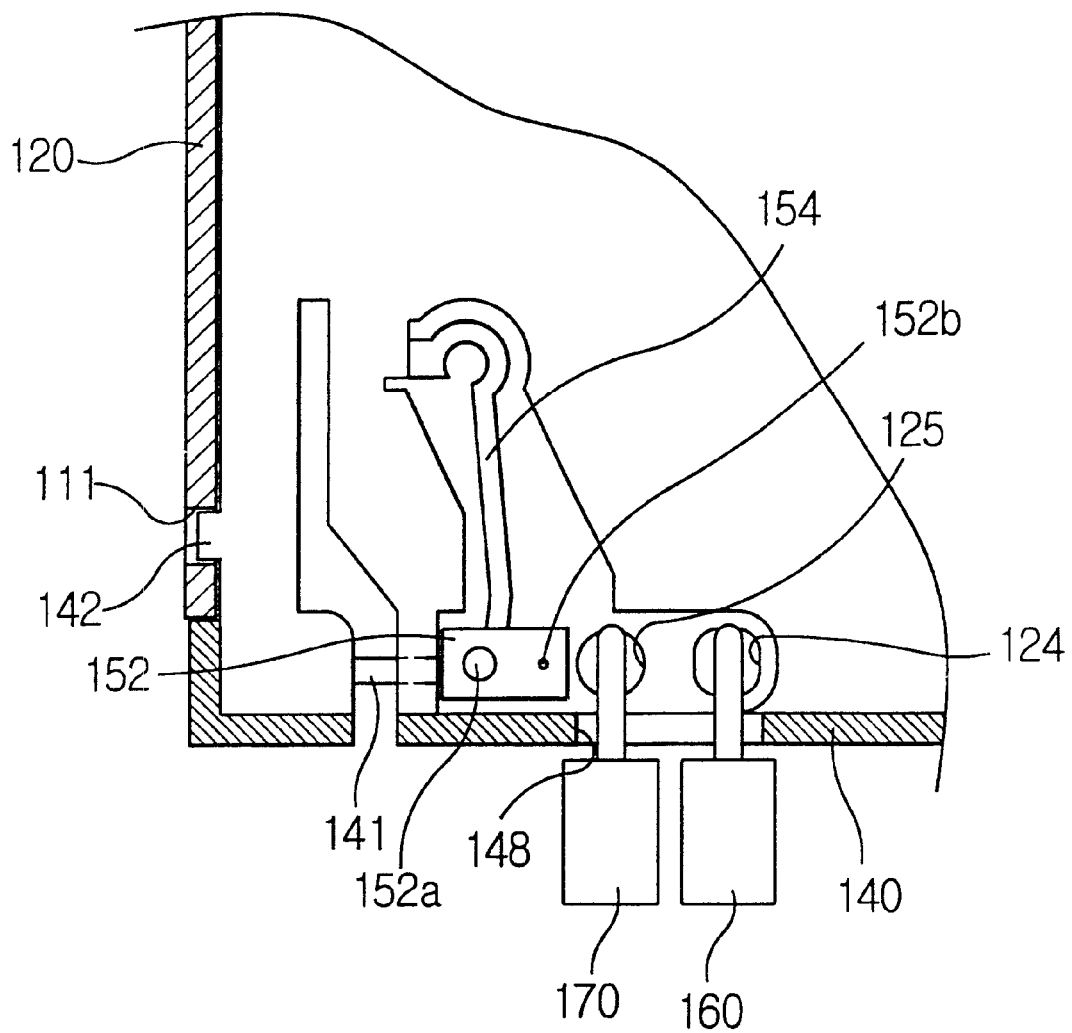

More specifically, the states of the disc can be sensed through the horizontal sensor holes 148 formed at front surfaces of the opening cover 140, and the same is shown in FIGS. 11A to 11C.

The states of the disc are sensed by the same operation as the one described above with respect to FIGS. 10A to FIG. 10C, except for the fact that the sensor switches 160 and 170 of the driver are horizontally disposed, and inserted horizontally into the sensor holes 148 formed at front surface of the opening cover 140. Thus, the further detailed description thereof will be omitted.

Figure 12:
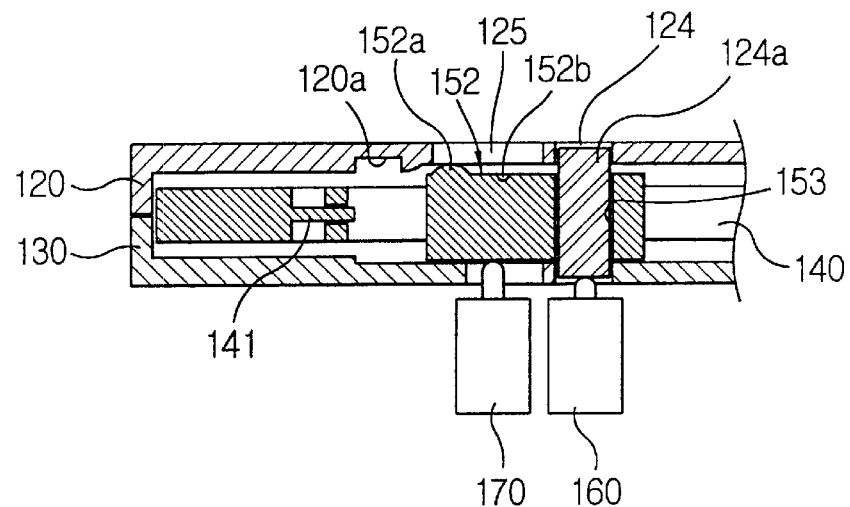
FIG. 12 is a vertical sectional view showing a main portion of the cartridge having a sensor hole according to a third preferred embodiment of the present invention.
Figure 13A:
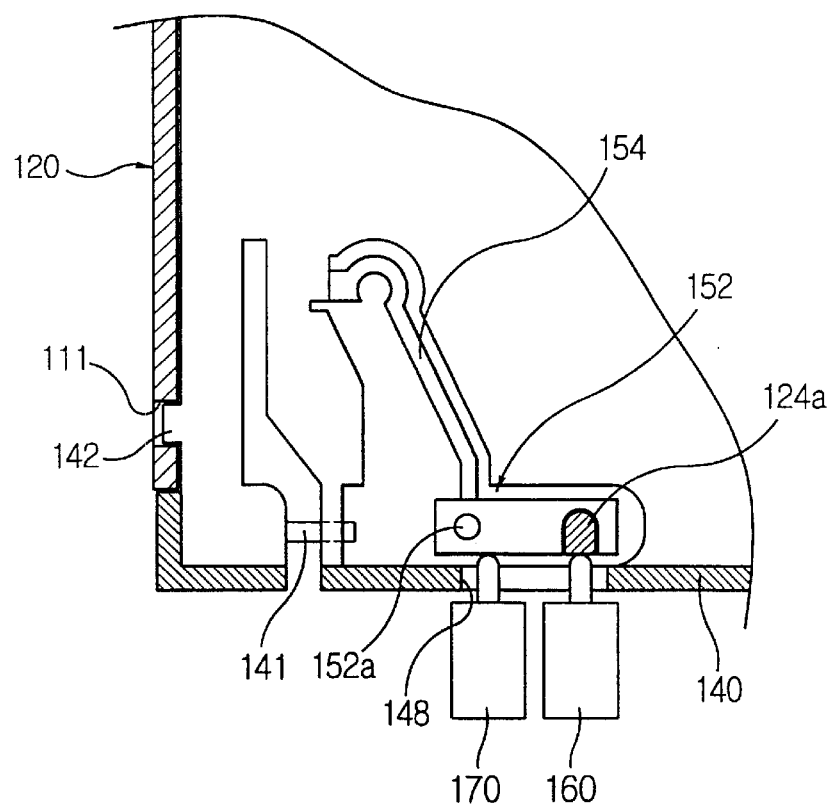
FIGS. 13A, 13B, and 13C are transverse sectional views for explaining a structure and operation of means for opening/closing the sensor hole of FIG. 12.
Figure 13B:
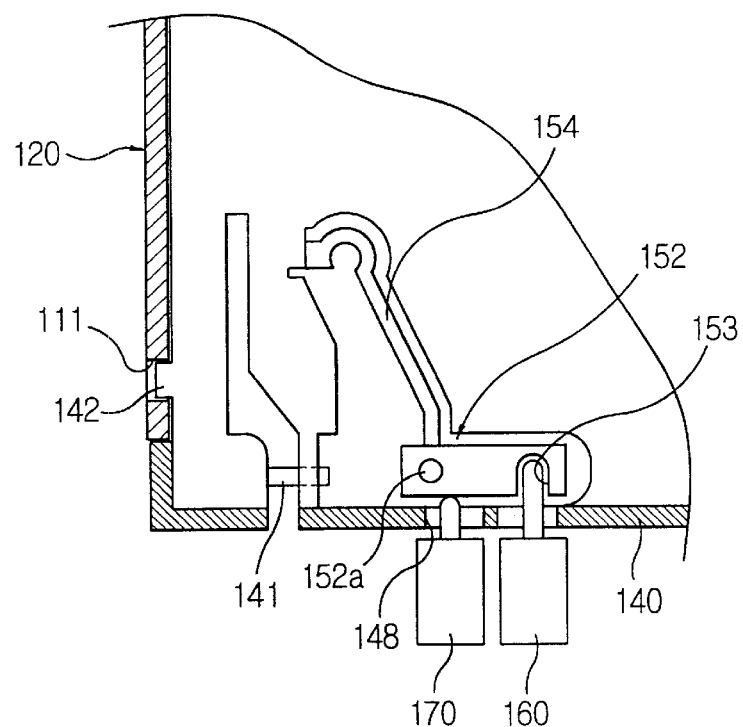
Figure 13C:
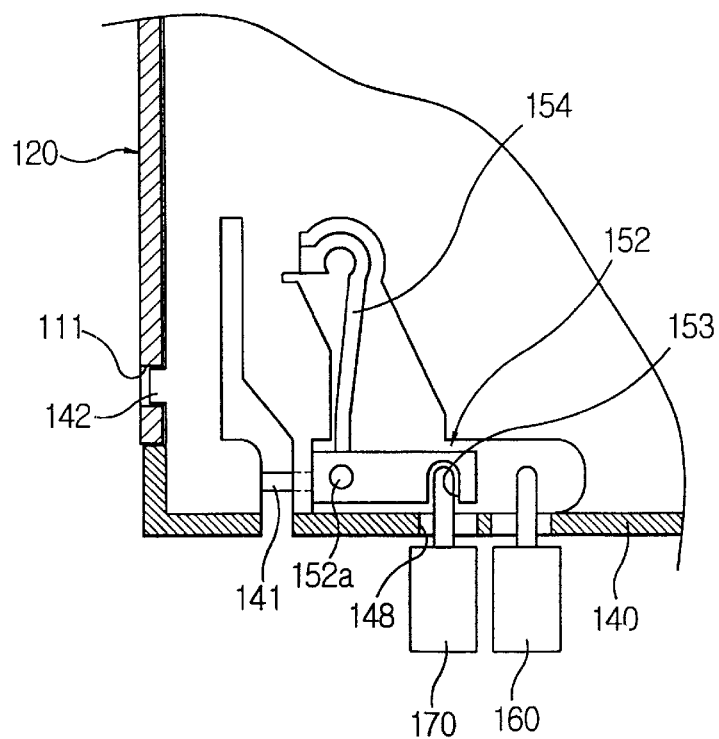

FIG. 12 is a vertical sectional view showing a main portion of a cartridge having a sensor hole according to a third preferred embodiment of the present invention, and FIGS. 13A, 13B, and 13C are transverse sectional views for explaining a structure and operation of the means for opening/closing the sensor hole of FIG. 12.

As shown in the figures, the basic structure of the cartridge is similar to the cartridge according to the second preferred embodiment of the present invention. Accordingly, like elements of the second preferred embodiment will be given the same reference numerals throughout the description of the third preferred embodiment. Also, the features which have been described will not be repeated, but the emphasis will be focused on the unique feature of the third preferred embodiment.

According to the third preferred embodiment of the present invention, the opening/closing member 152 movably disposed at the space of the opening cover 140 extends over the A1 sensor hole 124. An annular space 153 corresponding to the A1 sensor hole 124 is formed at the extended portion of the opening/closing member 152, and the tap 124a for covering the A1 sensor hole 124 is disposed within the annular space 153. Upper and lower ends of the tap 124a are inserted into, thereby supported by the A1 sensor holes 124 and 134 of the upper and the lower shells 120 and 130. Accordingly, the opening/closing member 152 is moved only in absence of the tap 124a.

The operation of the means for opening/closing the sensor holes of the third preferred embodiment shown in FIGS. 13A to 13C is the same as the ones described above with respect to FIGS. 11A to 11C. Thus, the further detailed description thereof will be omitted. The unique feature of the third preferred embodiment of the present invention is that the opening/closing member 152 is only moved and opens the A3 sensor hole 125 when the tap 124a covering the A1 sensor hole 124 is eliminated.

Figure 14:
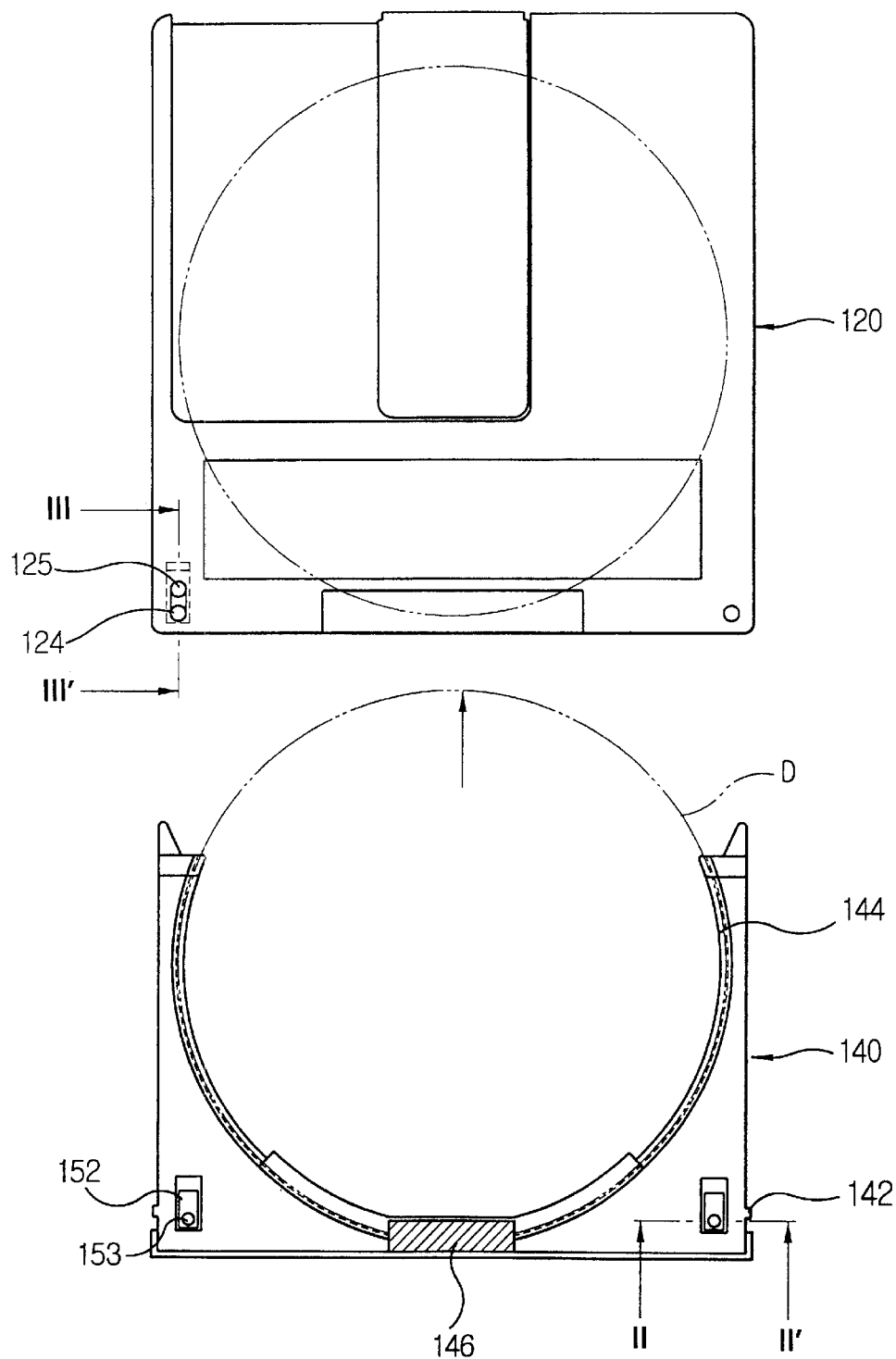
FIG. 14 is a plan view showing the cartridge having sensor hole to be opened/closed according to a fourth preferred embodiment of the present invention, in which the opening cover is separated therefrom.
Figure 15:
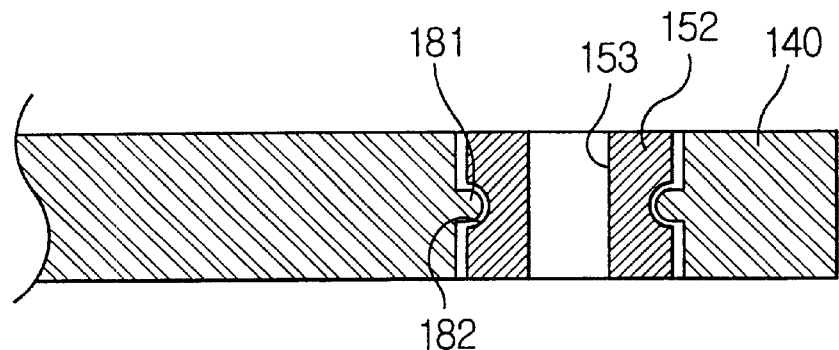
FIG. 15 is a sectional view taken along the line II—II of FIG. 14, to show one example of an opening/closing member of the cartridge of FIG. 14.
Figure 16A:
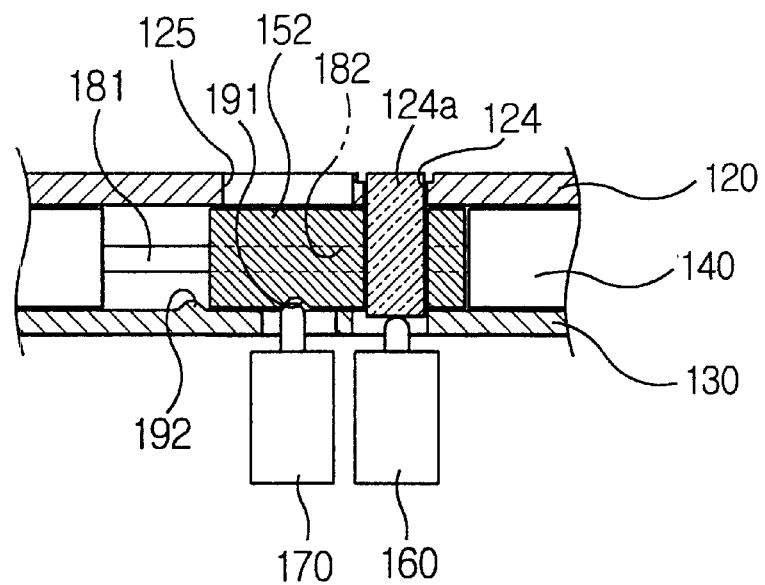
FIGS. 16A, 16B, and 16C are sectional views taken along the line III—III of FIG. 14, to explain the structure and operation of the means for opening/closing the sensor hole of the cartridge.
Figure 16B:
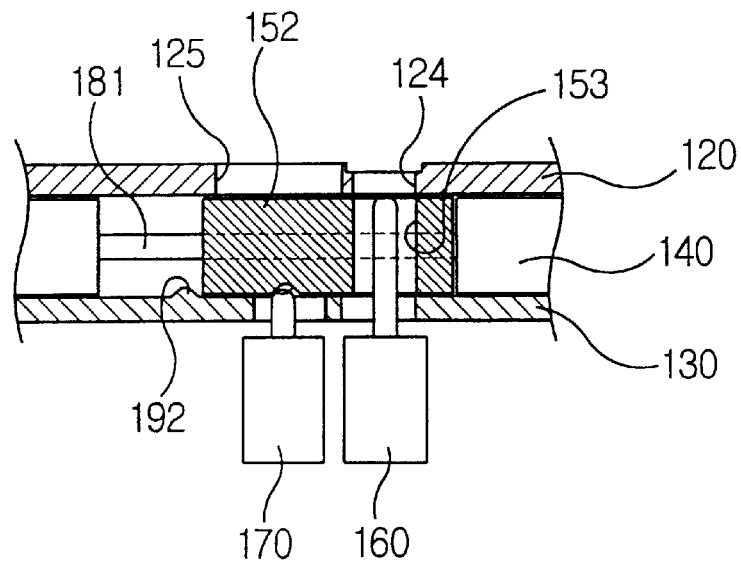
Figure 16C:
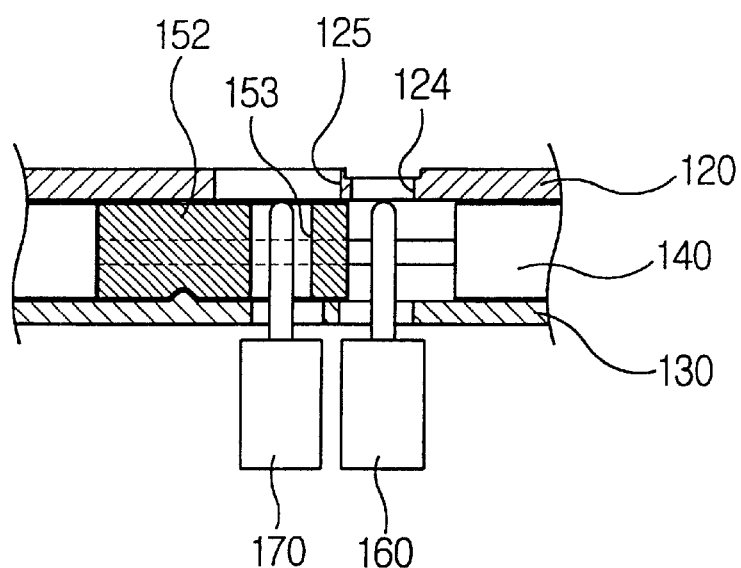

FIG. 14 is a plan view showing a cartridge having sensor hole to be opened/closed according to a fourth preferred embodiment of the present invention, in which the opening cover is separated from the cartridge, FIG. 15 is a sectional view taken along the line II—II of FIG. 14, to show one example of an opening/closing part of the cartridge of FIG. 14, and FIGS. 16A, 16B, and 16C are sectional views taken along the line III—III of FIG. 14, to explain the structure and operation of the means for opening/closing the sensor hole of the cartridge of FIG. 14.

As shown in the figures, the basic structure of the cartridge according to the fourth preferred embodiment of the present invention is the same as the structure of the cartridge according to the second and third preferred embodiments. Accordingly, the like elements of the third preferred embodiment will be given the same reference numerals throughout the description of the fourth preferred embodiment, and the features once described above will not be repeated, but the emphasis will be focused on the unique feature of the fourth preferred embodiment.

According to the disc cartridge of the fourth preferred embodiment, the positions of the A1 and A3 sensor holes 124 and 125 differ from the positions according to the second and third preferred embodiments. More specifically, while the A1 and A3 sensor holes of the second and the third preferred embodiments are arranged in a horizontal direction of the drawings, the sensor holes of the fourth preferred embodiment are arranged in a vertical direction of the drawings with respect to the cartridge case. The arrangement of the A1 and A3 sensor holes do not vary the function thereof but the A1 and A3 sensor holes are such arranged to meet the sensor switches of the driver.

The opening/closing member 152 movably disposed at the space of the opening cover 140 is slidably moved therein.

A pair of guide projections 181 are formed at both walls of the opening cover 140, which defines the space therebetween, and guide recesses 182 are formed at both side surfaces of the opening/closing member 152, to receive the guide projections 181. Accordingly, the opening/closing member 152 is moved within the space of the opening cover 140 forward and backward.

Additionally, a locking recess 191 is formed at a lower side of the opening/closing member 152, and a locking projection 192 is formed at a side of the lower shell 130, to be received into the locking recess 191 and thereby locking the opening/closing member 152. Accordingly, the position of the opening/closing member 152 is maintained. Also, due to the locking recess 191 of the opening/closing member 152 and the locking projection 192 of the lower shell 130, the opening/closing member 152 can be automatically returned to its initial position when the opening cover 140 is withdrawn from the cartridge case for disc replacement and inserted again thereto.

According to the fourth preferred embodiment of the present invention, the opening/closing member 152 extends over the position of A1 sensor hole 124, and an annular space 153 is defined at the extended portion of the opening/closing member 152. A tap 124a for covering the A1 sensor hole 124 is inserted into the annular space 153. The tap 124a is disposed to be supported by either one of the upper or the lower shell 120 or 130. Accordingly, the opening/closing member 152 can be moved only in absence of the tap 124a.

Since the structure for moving the opening/closing member 152 of the fourth preferred embodiment is similar to the same of the third preferred embodiment, the further detailed description thereof will be omitted.

Figure 17:
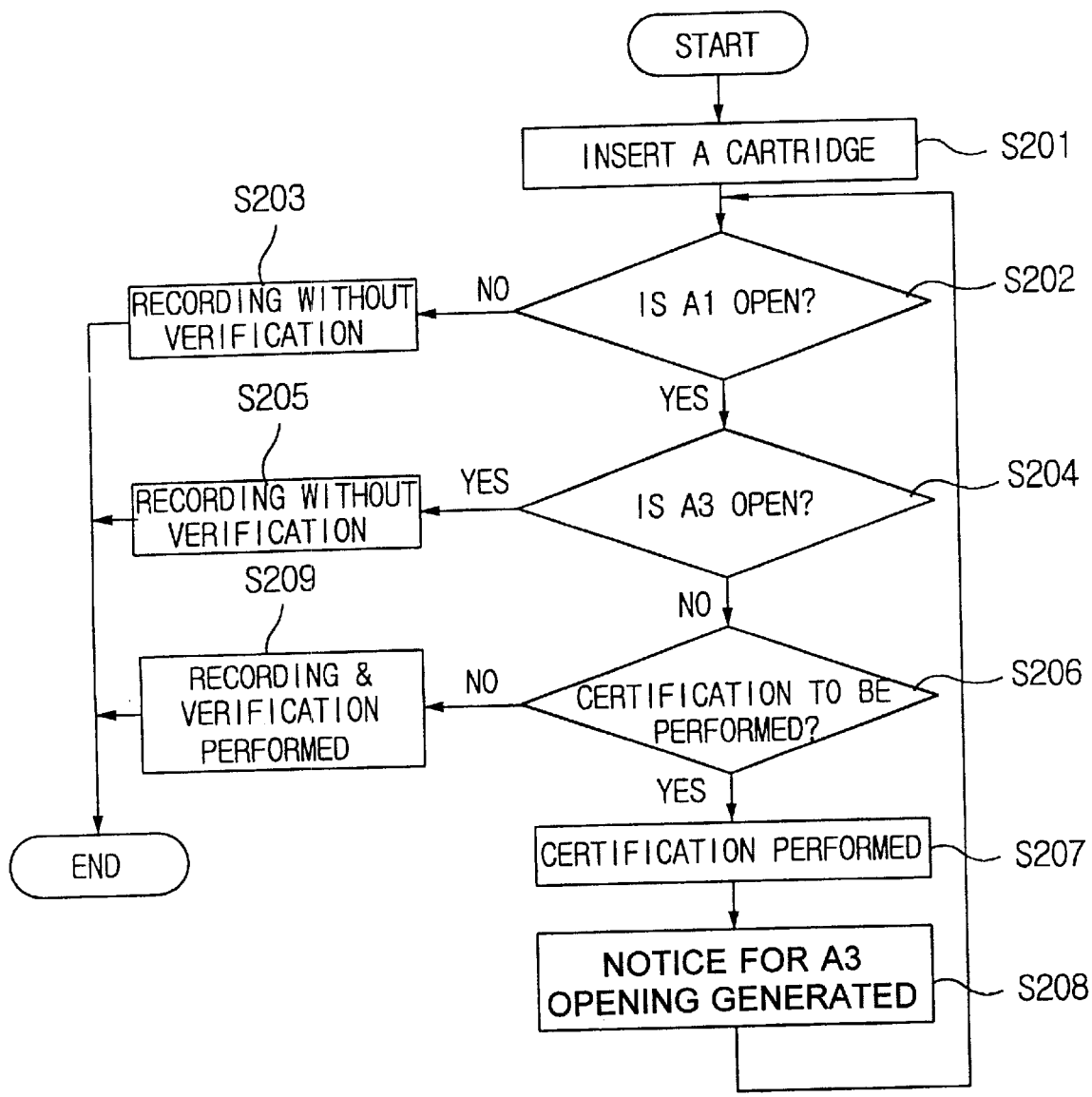
FIG. 17 is a flow chart for explaining a method for driving the cartridge having the sensor hole to be opened/closed according to the second through fourth preferred embodiments of the present invention.

The opening/closing state of the A1 and A3 sensor holes and the corresponding operation of the driver in the cartridge case having the A3 sensor hole are shown in Table 3 below, and FIG. 17.

The method for driving the cartridge having the A3 sensor hole to be opened/closed according to the second through fourth embodiments of the present invention will be described with respect to the Table 3 and FIG. 17.

TABLE 3

| A1 hole | A3 hole | States of disc | Driver |
|---|---|---|---|
| Closed | — | Disc-never-withdrawn | Recording without Verification |
| Open | Closed | Disc never withdrawn and no proper process performed | Recording Verification required |
| Open | Open | Disc withdrawn and proper process performed (Defect check & Cleaning) | Recording without Verification |

The second or the third type cartridge whose disc has been withdrawn therefrom and returned thereto, is again inserted into the driver (Step 201). Then, the open-state of the A1 sensor hole is determined (Step 202).

When the A1 sensor hole is in the closed-state in Step 202, the recording process without the Verification is performed (Step 203). Otherwise, i.e., when the A1 sensor hole is in the open-state or closed-state, the open-state of the A3 sensor hole is determined (Step 204).

When the A3 sensor hole is in the open-state in Step 204, the recording process is performed without the Verification process (Step 205), or otherwise, i.e., when the A3 sensor hole is in the closed-state, it is determined whether the Certification process is to be performed (Step 206).

When it is determined that the Certification process is to be performed in Step 206, the Certification process is performed in accordance with the particular format suggested by the Standard DVD-RAM specifications. In such a situation, the Certification process is not the Initialization process in which the previously existing information is ignored, but the re-Certification process, in which the previously existing information is maintained, is performed (Step 207).

When the defects of the disc exceed the predetermined extent, there may be an additional step of informing the user of such state and recommending to the user to eliminate the contamination of the disc in a proper way. Also, when it is determined that the cartridge inserted into the driver has the closed A3 sensor hole in Step 204, then the additional step of recommending the user accelerate the information processing process by performing the re-Certification process, may be included.

Upon completion of the re-Certification process, the notice for opening the A3 sensor hole is provided to the user, since if A3 sensor hole is in the open-state, no Verification process is required so that the information processing process is accelerated (Step 208). Accordingly, when the Step 205 is executed after positioning the A3 sensor hole to the open-position, the information recording is performed without the Verification process. Meanwhile, when it is determined in Step 206 that the Certification process is not required, the recording along with the Verification process is performed (Step 209).

FIGS. 18A through 20B show the main structure and operation of a cartridge according to the fifth preferred embodiment of the present invention, having the open-state sensor hole to be opened/closed which is integrated with the recording-prevention sensor hole.

As shown in the figures, according to the fifth preferred embodiment, the recording-prevention sensor hole for preventing the information recording, and the open-state sensor hole for sensing the opened state of the cartridge case are used. Here, the recording-prevention sensor hole as well as the open-state sensor hole are controlled by the sensor lever so as to be opened/closed.

According to such a structure for opening/closing the sensor holes, one sensor lever is moved to the recording-prevention position, or to indicate the opened state or inspected state of the cartridge while recording. Since the recording-prevention and open-state sensor holes to be opened/closed are subsequently opened/closed by one sensor lever, the possible mis-operation is prevented, and the embodiment itself is much simplified. As a result, the reliability thereof increases.

The structure for opening/closing the recording-prevention and open-state sensor holes by one sensor lever has a sensor lever 250, locking portions 261 and 262, and an oval sensor hole 228. The sensor lever 250 has an opening/closing member 252 for covering both of adjacently formed open-state and recording-prevention sensor holes 224 and 226 and a tension rib 254 formed on the opening cover 240, which is for supporting the opening/closing member 252 and returning the opening/closing member 252 to the corresponding position when the opening/closing member 252 is opened/closed. The locking portions 261 and 262 are formed on the cartridge case to fixedly lock the sensor lever 250 when the sensor lever 250 is moved leftward and rightward. The oval sensor hole 228 is an integration of the open-state and recording-prevention sensor holes 224 and 226.

Reference numerals 260 and 270 in the figures denote the sensor switches.

Figure 18A:
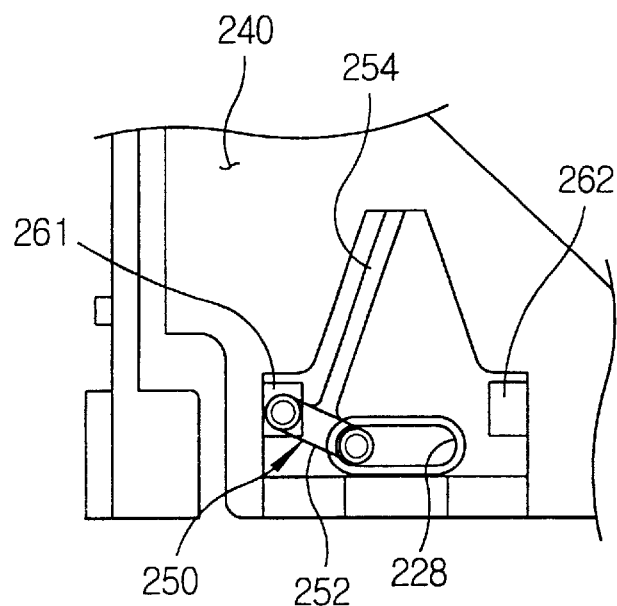
FIGS. 18A and 18B are a plan view and a side view, respectively, showing the cartridge having the sensor hole integrated with a recording-prevention sensor hole according to a fifth preferred embodiment of the present invention, in which the recording-prevention sensor hole is in the closed-state.
Figure 18B:
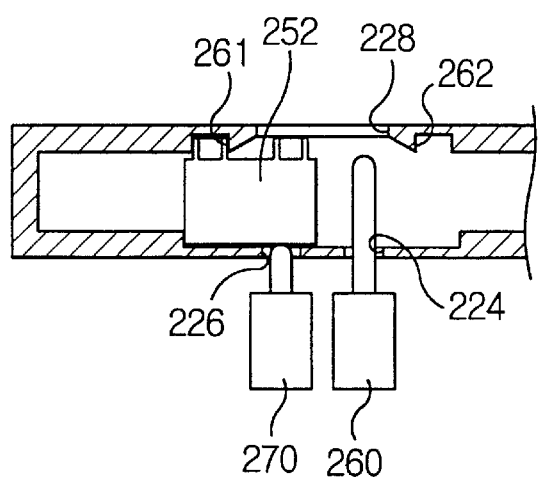
Figure 19A:
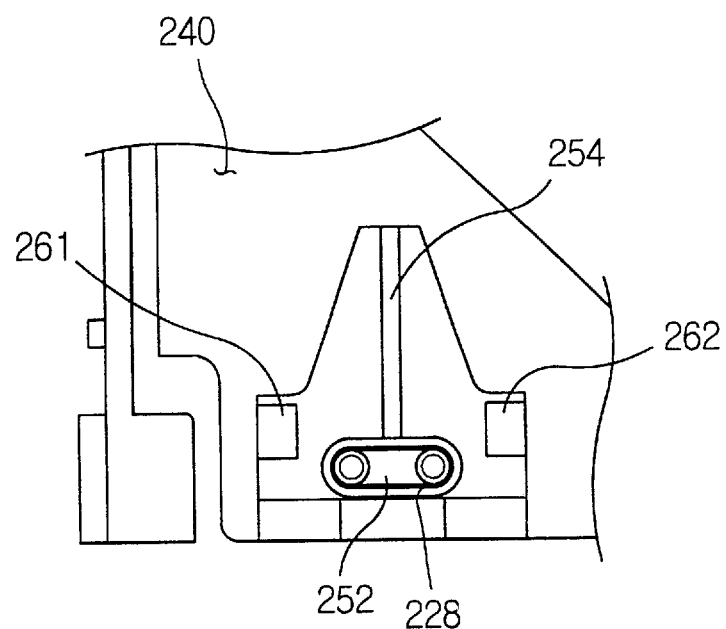
FIGS. 19A and 19B are a plan view and a side view, respectively, for showing the recording-prevention sensor hole and the sensor hole of FIGS. 18A and 18B, which are in the closed-state.
Figure 19B:
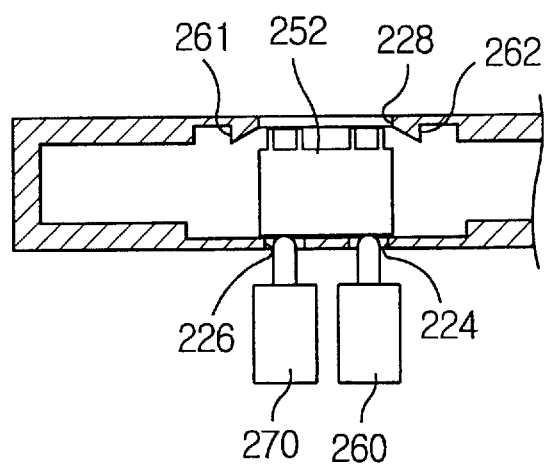
Figure 20A:
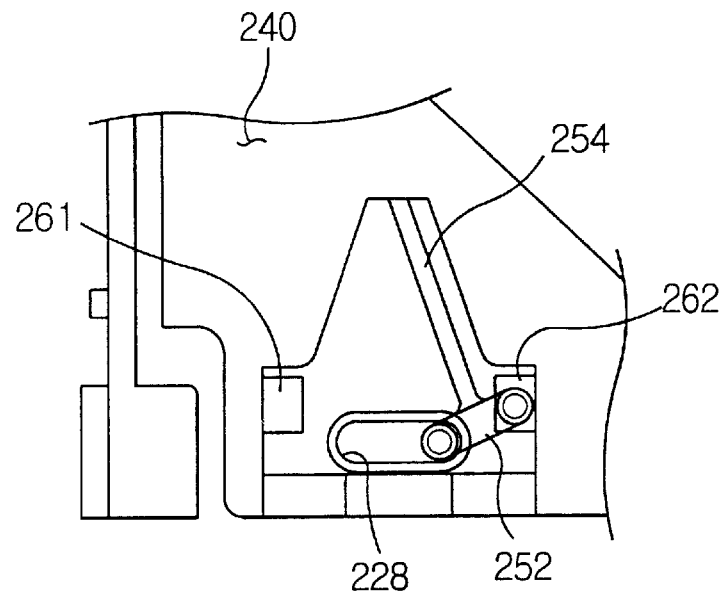
FIGS. 20A and 20B show a plan view and a side view, respectively, in which only the sensor hole is closed in FIGS. 18A and 18B.
Figure 20B:
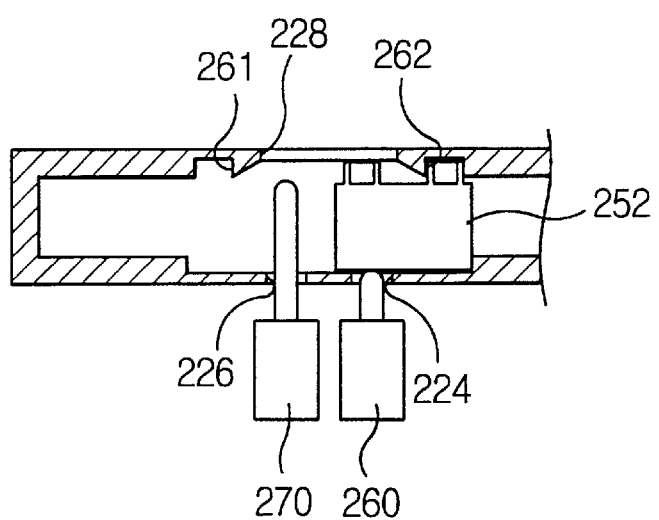

FIGS. 18A and 18B are a plan view and a side elevational view, respectively, showing the cartridge having the open-state sensor hole 224 integrated with the recording-prevention sensor hole 226 according to the fifth preferred embodiment of the present invention, in which the recording-prevention sensor hole is in the closed-state, FIGS. 19A and 19B are a plan view and a side elevational view, respectively, for showing the recording-prevention sensor hole 226 and the open-state sensor hole 224 of FIGS. 18A and 18B in the closed-state, and FIGS. 20A and 20B are a plan view and a side elevational view, respectively, for showing the open-state sensor hole 224 of FIGS. 18A and 18B in the closed-state. The operation of the driver in accordance with the closing and open-states of the open-state and recording-prevention sensor holes 224 and 226 are shown in following Table 4.

TABLE 4

| Recording-prevention sensor hole | Open-state sensor hole | Operation of driver |
|---|---|---|
| Open | Closed | Recording prevented |
| Closed | Open | Recording without Verification |
|  | Closed | Recording Verification required when A1 sensor hole is opened |

As shown in FIGS. 20A and 20B, when the recording-prevention sensor hole 226 is in the open-state, the recording is prevented, so that the information is not recorded. Thus, the recording is prevented regardless of states of the open-state sensor hole 224 for sensing the open-state, and accordingly, there is no need to determine whether the Verification is required or not.

When the recording-prevention sensor hole 226 is in the closed-state, as shown in FIGS. 18A through 19B, the opening-state sensor hole 224 can be either in the open-state or in the closed-state. Here, as shown in FIGS. 18A and 18B, the recording is performed without the Verification process when the open-state sensor hole 224 is in the open-state, while as shown in FIGS. 19A and 19B, the information Verification is required when the open-state sensor hole 224 is in the closed-state.

Meanwhile, when the open-state and recording-prevention sensor holes 224 and 226 are integrated according to the fifth preferred embodiment of the present invention, there may be A1 and A3 sensor holes altogether and there may not. Also, there may be A1 sensor hole only.

Further, when the opening cover 240 of the cartridge case is open and closed, as shown in FIGS. 19A and 19B, the sensor lever 250 is automatically returned to the middle-position by incorporating with the locking portions 261 and 262 of the cartridge case. Thus, when the opening cover is opened, it is automatically indicated that the recording Verification is required.

Figure 21:
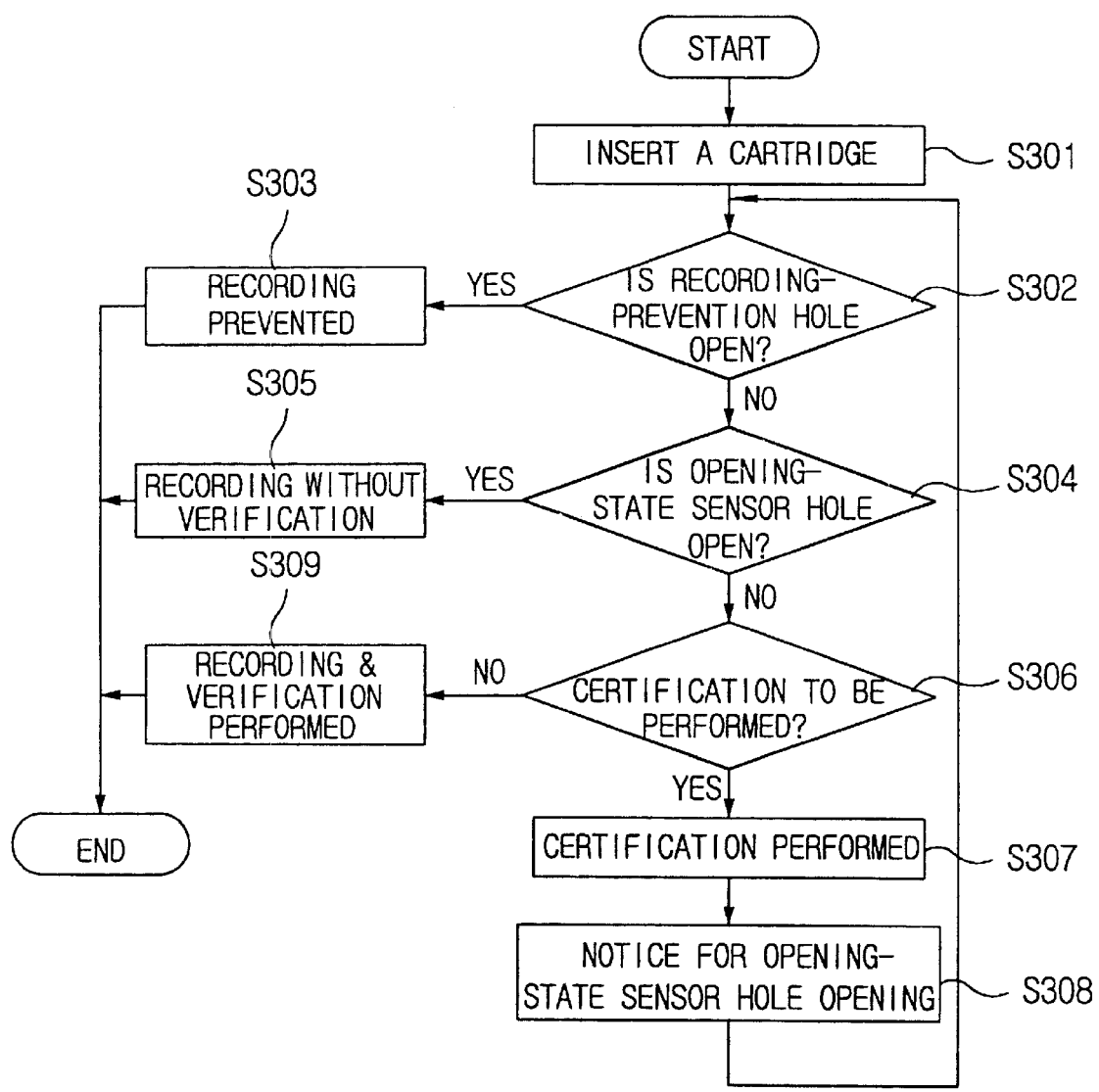
FIG. 21 is a flow chart for explaining a method for driving the cartridge having a sensor hole to be opened/closed according to the fifth preferred embodiment of the present invention.

FIG. 21 is a flow chart for explaining a method for driving the cartridge shown in FIGS. 18A to 20B, which has the integrated recording-prevention sensor hole and the sensor hole. Hereinafter, the method for driving the cartridge according to the fifth preferred embodiment will be described in greater detail with respect to FIG. 21.

The second or third type cartridge whose disc has been withdrawn and returned thereto is inserted into the driver (Step 301). Then, it is determined whether the recording-prevention sensor hole is in the open-state (Step 302).

When the recording-prevention sensor hole is in open-state in Step 302, recording-prevention state is determined (Step 303), or otherwise, i.e., when the recording-prevention sensor hole is in the closed-state, it is determined whether the opening-state sensor hole is in open-state (Step 304).

When the opening-state sensor hole is in the open-state in Step 304, the information recording is performed without the Verification process (Step 305), or otherwise, i.e., when the opening-state sensor hole is in the closed-state, then it is determined whether the Certification process for detecting the defects of the disc should be performed (Step 306).

When it is determined that the Certification process has to be performed in Step 306, the Certification process is performed in accordance with the particular format suggested by the Standard DVD-RAM specifications. In this case, the Certification process is not the initialization process in which the previously existing information is ignored, but the re-Certification process, in which the previously existing information is maintained, is performed (Step 307).

When the defected area detected in Step 307 exceeds the predetermined extent, the user is notified a recommendation that he may eliminate the contamination of the disc in a proper way. Also, in Step 304, when the cartridge inserted into the driver has the opening-state sensor hole which is closed, there may be an additional step of recommending to the user that he may accelerate the information processing process by performing the re-Certification process.

Upon completion of the re-Certification process, the notice for opening the opening-state sensor hole is generated indicating that the information processing process can be accelerated due to the absence of the Verification process if the open-state sensor hole is opened (Step 308). Accordingly, if the user shifts the opening-state sensor hole to the open-state and performs the Step 303, the recording is performed without the Verification process. Meanwhile, when it is determined in Step 306 that the Certification process is not required, then the recording process along with the Verification is performed (Step 309).

As described above, the present invention provides the cartridge having such a structure that a sensor hole is flexibly opened/closed. That is, when the opening cover is opened, the sensor hole is automatically shifted to the open-state to indicate such a state, while upon completion of the Certification or re-Certification process, the sensor hole is shifted to the corresponding states. Accordingly, the error in recording is prevented even in the absence of the Verification process, and the information processing process can be much accelerated.

While the present invention has been particularly shown and described with reference to the preferred embodiment thereof, it will be understood by those skilled in the art that various changes in form and details may be effected therein without departing from the spirit and scope of the invention as defined by the appended claims.

As described above, the present invention provides the cartridge having such a structure that thea sensor hole is flexibly opened/closed. That is, when the opening cover is opened, the sensor hole is automatically shifted to the open-state to indicate such a state, while upon completion of the Certification or re-Certification process, the sensor hole is shifted to the corresponding states. Accordingly, the error in recording is prevented even in the absence of the Verification process, and the information processing process can be much accelerated.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A cartridge for receiving a disc, comprising:
   a cartridge case to receive the disc;
   an opening cover separably mounted to a side of the cartridge case, to support the disc to be withdrawn/received from/into the cartridge case;
   an A1 sensor hole never to be opened/closed, to determine whether the disc has been withdrawn from the cartridge case;
   a second sensor hole to determine whether the disc has been withdrawn from the cartridge case; and
   means for opening/closing the second sensor hole in accordance with states of the disc.

2. The cartridge as claimed in claim 1, wherein the cartridge is a second or a third type cartridge of Standard DVD-RAM specifications.

3. The cartridge as claimed in claim 1, wherein the disc is a single-side disc.

4. The cartridge as claimed in claim 1, wherein the disc is a double-side disc, and the second sensor hole corresponds to both sides of the disc, to determine whether the disc has been withdrawn from the cartridge case.

5. The cartridge as claimed in claim 1, wherein the states of the disc is a cartridge opened state indicating whether the disc has been withdrawn from the cartridge and a disc inspected state indicating whether the disc has undergone a certification process in which defects have been eliminated.

6. The cartridge as claimed in claim 1, wherein the opening cover has a horizontal sensor hole perpendicular to the A1 sensor hole and the second sensor hole which are defined through upper and lower portions of the cartridge case, so that the cartridge is compatible with a driver having a vertical sensor switch as well as a driver having a horizontal sensor switch.

7. The cartridge as claimed in claim 1, wherein the second sensor hole is an A3 sensor hole of Standard DVD-RAM specifications.

8. The cartridge as claimed in claim 7, wherein the means for opening/closing the second sensor hole comprises:
- an opening/closing member movably disposed on the opening cover corresponding to the A3 sensor hole, to be moved between a close-position and an open-position of the A3 sensor hole, to selectively open the A3 sensor hole;
- a tension rib to elastically support the opening/closing member, to maintain the position of the opening/closing member at the close-position of the A3 sensor hole; and
- locking means for maintaining the position of the opening/closing member upon movement to the open-position of the A3 sensor hole.

9. The cartridge as claimed in claim 8, wherein the locking means comprises:
- a locking projection protruded from an upper side surface of the opening/closing member; and
- a locking portion formed at an inner side of the cartridge case, while corresponding to the locking projection, wherein a recess is formed at other side of the opening/closing member, to move the opening/closing member.

10. The cartridge as claimed in claim 8, further comprising a returning lever to push the opening/closing member which has been moved to the open-position of the A3 sensor hole and to return the opening/closing member to the close-position of the A3 sensor hole, subsequent to an opening movement of the opening cover relative to the cartridge case.

11. The cartridge as claimed in claim 8, wherein the opening/closing member has an extended portion extending over to a position of A1 sensor hole, a space corresponding to the A1 sensor hole is formed at the extended portion of the opening/closing member, the cartridge further comprising a tap supportably disposed within an inner circumference of the space or at the cartridge case while covering the A1 sensor hole, and the opening/closing member is unmovable in a presence of the tab within the inner circumference of the space or at the cartridge case.

12. The cartridge as claimed in claim 11, wherein the A3 sensor hole is always in a closed-state when the A1 sensor hole is in a closed-state, and the A3 sensor hole is in the closed-state or the open-state when the A1 sensor hole is in the open-state, wherein the closed-state of the A3 sensor hole indicates that a verification process is required while recording information on the disc, and the open-state of the A3 sensor hole indicates no need for the verification process during recording the information on the disc.

13. The cartridge as claimed in claim 7, wherein the means for opening/closing the second sensor hole comprises:
- an opening/closing member slidably disposed on the opening cover corresponding to the A3 sensor hole, to be moved between a close-position and an open-position of the A3 sensor hole, to selectively open the A3 sensor hole;
- means for guiding the movement of the opening/closing member; and
- locking means for maintaining the position of the opening/closing member upon movement to the open-position of the A3 sensor hole.

14. The cartridge as claimed in claim 13, wherein the opening/closing member has an extended portion extending over a position of the A1 sensor hole, a space is defined at the extended portion of the opening/closing member, the cartridge further comprising a tap supportably disposed within an inner circumference of the space or at the cartridge case while covering the A1 sensor hole, and the opening/closing member is unmovable in a presence of the tap within the inner circumference of the space or at the cartridge case.

15. The cartridge as claimed in claim 13, wherein the opening/closing member is automatically returned to the close-position of the A3 sensor hole when the opening cover which was opened is closed.

16. A method of driving a cartridge inserted into a drive and having an A3 sensor hole to be opened/closed, comprising:
- determining whether the A3 sensor hole of the inserted cartridge senses a first state, the first state being a closed-state of the A3 sensor hole;
- performing a certification process when the A3 sensor hole is in the first state; and
- controlling the A3 sensor hole upon completion of the certification process to set the A3 sensor hole to an inspected state of the disc, the inspected state being a second state in which the A3 sensor hole senses that the disc has never been withdrawn from the cartridge, and the second state being an open-state of A3 first sensor hole,
- wherein the A3 sensor hole is an A3 sensor hole of Standard DVD-RAM specifications.

17. A method of driving a cartridge inserted into a drive and having a first sensor hole to be opened/closed, comprising:
- determining whether the first sensor hole of the inserted cartridge senses a first state;
- performing a certification process when the first sensor hole is in the first state;
- controlling the first sensor hole upon completion of the certification process to set the sensor hole to an inspected state of the disc;
- detecting first and second states of a second sensor hole of the inserted cartridge to determine whether the disc has ever been removed from the cartridge; and
- recording data without performing the verification process regardless of the states of the first sensor hole if it is determined the disc has never been removed from the cartridge using the detected states of the second sensor hole,
- wherein
  - the inspected state is a second state in which the first sensor hole senses that the disc has never been withdrawn from the cartridge, and
  - the first sensor hole is an A3 sensor hole of Standard DVD-RAM specifications, the first state is a closed-state of the first sensor hole, and the second state is an open-state of the first sensor hole.

18. A cartridge for receiving a disc, comprising:
- a cartridge case to receive the disc;
- an opening cover separably mounted to the cartridge case;
- a first sensor hole disposed on one of the cartridge case and the opening cover, the first sensor hole having a first state indicating the disc has never been withdrawn from the cartridge case and that a verification operation is not to be performed, and a second state indicating the disc has been withdrawn from the cartridge case that that the verification operation may be performed;
- a second sensor hole disposed on one of the cartridge case and the opening cover, the second sensor hole having a first state to indicate a certification process has not been performed and that the verification operation is to be performed if the first sensor is in the second state, and a second state to indicate the certification process has been performed and that the verification operation is not to be performed if the first sensor is in the second state; and a member disposed at the second sensor hole to alternate a state of the second sensor hole in accordance with whether the certification has been performed.

19. The cartridge of claim 18, further comprising a removable member disposed at the first sensor hole, wherein:

the first state of the first sensor hole comprises when the removable member is in the first sensor hole, and the second state of the first sensor hole comprises when the removable member is removed from the first sensor hole.

20. The cartridge of claim 19, wherein the removable member cannot be replaced in the first sensor hole once removed.

* * * * *